(12) United States Patent
Liu et al.

(10) Patent No.: US 12,096,499 B2
(45) Date of Patent: Sep. 17, 2024

(54) RESUMING COMMUNICATION WITH A SECONDARY NODE IN DUAL CONNECTIVITY

(71) Applicant: Qualcomm Incorporated, San Diego, CA (US)

(72) Inventors: Huichun Liu, Beijing (CN); Gavin Bernard Horn, La Jolla, CA (US); Ozcan Ozturk, San Diego, CA (US); Miguel Griot, La Jolla, CA (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 17/284,046

(22) PCT Filed: Nov. 8, 2019

(86) PCT No.: PCT/CN2019/116619
§ 371 (c)(1),
(2) Date: Apr. 9, 2021

(87) PCT Pub. No.: WO2020/098572
PCT Pub. Date: May 22, 2020

(65) Prior Publication Data
US 2021/0410216 A1     Dec. 30, 2021

(30) Foreign Application Priority Data
Nov. 12, 2018   (WO) ............... PCT/CN2018/115014

(51) Int. Cl.
*H04W 76/15*   (2018.01)
*H04W 24/10*   (2009.01)
(Continued)

(52) U.S. Cl.
CPC ........... *H04W 76/15* (2018.02); *H04W 24/10* (2013.01); *H04W 68/005* (2013.01); *H04W 76/19* (2018.02); *H04W 76/20* (2018.02)

(58) Field of Classification Search
None
See application file for complete search history.

(56) References Cited

U.S. PATENT DOCUMENTS 11,432,360 B2 *   8/2022   Mildh ................... H04W 76/19
11,785,511 B2 *   10/2023  Teyeb ................. H04W 36/305
                                                                370/331

(Continued)

FOREIGN PATENT DOCUMENTS

WO    WO-2018174791 A1    9/2018

OTHER PUBLICATIONS

CATT: "Master RAN Node Change for RRC Inactive UEs", 3GPP TSG-SA WG2 Meeting #127bis, S2-185248, Jun. 1, 2018 (Jun. 1, 2018), Reason for change;4.8.2 Connection Resume Procedure, 2 Pages.

(Continued)

*Primary Examiner* — Eunsook Choi
(74) *Attorney, Agent, or Firm* — Holland & Hart LLP/Qualcomm Incorporated

(57) ABSTRACT

Methods, systems, and devices for wireless communications are described. A first base station may identify that the first base station is a secondary node for a user equipment (UE) operating in a dual connectivity deployment, where the UE is in a radio resource control (RRC) inactive state. The first base station may receive, from the UE, a request to resume communications with the first base station and a second base station that is a master node in the dual connectivity deployment. The first base station may verify the UE using an access stratum context associated with the UE, and resume (Continued)

communications with the UE based at least in part on the request and the access stratum context. The first base station may resume communications as a secondary node or as a master node. In some cases, the UE may resume communications without entering an RRC idle state.

30 Claims, 19 Drawing Sheets

(51) Int. Cl.
*H04W 68/00* (2009.01)
*H04W 76/19* (2018.01)
*H04W 76/20* (2018.01)

(56) References Cited

U.S. PATENT DOCUMENTS

| | | | |
|---|---|---|---|
| 2017/0332431 | A1 | 11/2017 | Kim et al. |
| 2019/0357292 | A1* | 11/2019 | Cirik ................... H04L 5/0053 |
| 2020/0169922 | A1* | 5/2020 | Ozturk .............. H04W 36/0027 |
| 2021/0329723 | A1* | 10/2021 | Teyeb ................. H04W 12/106 |

OTHER PUBLICATIONS

Ericsson: "NR/LTE Tight Interworking: CP Requirements on Mobility and Dual Connectivity", 3GPP TSG-RAN WG2 #94, R2-163993, May 27, 2016(May 27, 2016), 5 Pages.
Ericsson: "Preserving NR PDCP Version", 3GPP TSG-RAN WG2 #99bis, R2-1711137, Oct. 13, 2017(Oct. 13, 2017), 8 Pages.
Huawei, et al., "State Transition for the UE on Getting NAS Notification", 3GPP TSG-SA WG2 Meeting #129, S2-1810481, Oct. 19, 2018 (Oct. 19, 2018), 5 pages, pp. 1, 3-4.
Intel Corporation: "Inactive and Dual Connectivity", 3GPP TSG RAN WG2 Meeting #99, R2-1708808, Aug. 25, 2017(Aug. 25, 2017), 3 Pages.
Intel, et al., "Support for Subscription- or Deployment-based RAT or CN Restrictions", SA WG2 Meeting #122 bis, S2-176105, Aug. 25, 2017 (Aug. 25, 2017), 6 pages, the whole document.
International Search Report and Written Opinion—PCT/CN2019/116619—ISA/EPO—Feb. 3, 2020.
International Search Report and Written Opinion—PCT/CN2018/115014—ISA/EPO—Apr. 28, 2019.
QUALCOMM Incorporated: "Coexistence between RRC Inactive and DC", 3GPP Draft, 3GPP TSG-RAN WG2 Meeting #102, R2-1808357, Coexistence_Inactive DC, 3rd Generation Partnership Project (3GPP), Mobile Competence Centre, 650, Route Des Lucioles, F-06921 Sophia-Antipolis Cedex, France, vol. RAN WG2, No. Busan, Korea, May 21, 2018-May 25, 2018, May 20, 2018 (May 20, 2018), XP051444633, 4 Pages, Retrieved from the Internet: URL: http://www.3gpp.org/ftp/Meetings%5F3GPP%SFSYNC/RAN2/Docs/ [Retrieved on May 20, 2018] The Whole Document.
QUALCOMM Incorporated: "Paging and Mobility for MR-DC with RRC_Inactive", 3GPP Draft, 3GPP TSG-RAN WG2 Meeting #104, R2-1818495 MRDC_Inactive Paging, 3rd Generation Partnership Project (3GPP), Mobile Competence Centre, 650, Route Des Lucioles, F-06921 Sophia-Antipolis Cedex, France, vol. RAN WG2, No. Spokane, WA, USA, Nov. 12, 2018-Nov. 16, 2018, Nov. 2, 2018 (Nov. 2, 2018), XP051482351, 2 Pages, Retrieved from the Internet: URL: http://www.3gpp.org/ftp/tsg%5Fran/WG2%5FRL2/TSGR2%5F104/Docs/R2%2D1818495%2Ezip [Retrieved on Nov. 2, 2018] The Whole Document.
Samsung: "MR-DC Configuration in Inactive State", 3GPP Draft, 3GPP TSG-RAN WG2 Meeting #103, R2-1812538 MR-DC Configuration in Inactive State, 3rd Generation Partnership Project (3GPP), Mobile Competence Centre, 650, Route Des Lucioles, F-06921 Sophia-Antipolis Cedex, France, vol. RAN WG2, No. Gothenburg, Sweden, Aug. 20, 2018-Aug. 24, 2018, Aug. 10, 2018 (Aug. 10, 2018), XP051522133, 4 Pages, Retrieved from the Internet: URL: http://www.3gpp.org/ftp/tsg%5Fran/WG2%5FRL2/TSGR2%5F103/Docs/R2%2D1812538%2Ezip [Retrieved on Aug. 10, 2018] The Whole Document.
Supplementary European Search Report—EP19885592—Search Authority—Berlin—Jul. 8, 2022.

* cited by examiner

RESUMING COMMUNICATION WITH A SECONDARY NODE IN DUAL CONNECTIVITY

CROSS REFERENCE TO RELATED APPLICATIONS

The present Application for Patent claims priority to International Patent Application No. PCT/CN2019/116619 by Liu et al., entitled "RESUMING COMMUNICATION WITH A SECONDARY NODE IN DUAL CONNECTIVITY," filed Nov. 8, 2019; and to International Patent Application No. PCT/CN2018/115014 by Liu et al., entitled "RESUMING COMMUNICATION WITH A SECONDARY NODE IN DUAL CONNECTIVITY," filed Nov. 12, 2018, each of which is assigned to the assignee hereof and each of which is hereby incorporated by reference in its entirety.

BACKGROUND

The following relates generally to wireless communications, and more specifically to resuming communication with a secondary node in a dual connectivity deployment.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communication systems, a UE may communicate with two or more base stations in a dual connectivity deployment. A UE may suspend communications with one or both base stations and may subsequently resume communications with at least one of the base stations. In some cases, the process of resuming communications may incur undesirable signaling overhead or latency for the UE or the base stations. Efficient techniques for resuming communications in a dual connectivity deployment are desired.

SUMMARY

The described techniques relate to improved methods, systems, devices, and apparatuses that support resuming communication with a secondary node in dual connectivity. Generally, the described techniques allow a UE that is operating in a radio resource control (RRC) inactive state in a dual connectivity deployment to resume communications with a secondary node of the dual connectivity deployment without entering the RRC idle state. In some cases, the secondary node may support this UE behavior by storing access stratum context for the UE at the secondary node. Upon receiving a request to resume communications from the UE, the secondary node may verify the UE using the stored access stratum context, and may resume communications with the UE without the UE entering the RRC idle state. In some cases, the secondary node may remain the secondary node after communications are resumed, while in other cases the secondary node may become the new master node and the old master node may be released. In some cases, the secondary node may initiate inter-radio access technology (inter-RAT) paging to prompt the UE to request to resume communications. The secondary node may initiate the inter-RAT paging directly, by paging the UE, or indirectly, by causing the master node to page the UE.

A method of wireless communication at a first base station is described. The method may include identifying that the first base station is a secondary node for a UE operating in a dual connectivity deployment, where the UE is in a radio resource control (RRC) inactive state, and receiving, from the UE, a request to resume communications with the first base station and a second base station that is a master node in the dual connectivity deployment. The method may include verifying the UE using an access stratum context associated with the UE, and resuming communications with the UE based on the request and the access stratum context.

An apparatus for wireless communication at a first base station is described. The apparatus may include a processor, memory in electronic communication with the processor, and instructions stored in the memory. The instructions may be executable by the processor to cause the apparatus to identify that the first base station is a secondary node for a UE operating in a dual connectivity deployment, where the UE is in a radio resource control (RRC) inactive state, and receive, from the UE, a request to resume communications with the first base station and a second base station that is a master node in the dual connectivity deployment. The instructions may be executable by the processor to cause the apparatus to verify the UE using an access stratum context associated with the UE, and resume communications with the UE based on the request and the access stratum context.

Another apparatus for wireless communication at a first base station is described. The apparatus may include means for identifying that the first base station is a secondary node for a UE operating in a dual connectivity deployment, where the UE is in a radio resource control (RRC) inactive state, and receiving, from the UE, a request to resume communications with the first base station and a second base station that is a master node in the dual connectivity deployment. The apparatus may include means for verifying the UE using an access stratum context associated with the UE, and resuming communications with the UE based on the request and the access stratum context.

A non-transitory computer-readable medium storing code for wireless communication at a first base station is described. The code may include instructions executable by a processor to identify that the first base station is a secondary node for a UE operating in a dual connectivity deployment, where the UE is in a radio resource control (RRC) inactive state, and receive, from the UE, a request to resume communications with the first base station and a second base station that is a master node in the dual connectivity deployment. The code may include instructions executable by a processor to verify the UE using an access stratum context associated with the UE, and resume communications with the UE based on the request and the access stratum context.

In some examples of the method, apparatuses, and non-transitory computer-readable medium described herein, verifying the UE using the access stratum context may include operations, features, means, or instructions for transmitting a request for verification of the UE to the master node, and receiving a verification confirmation from the master node, where the access stratum context may be stored at the master node. In some examples of the method, apparatuses, and non-transitory computer-readable medium described herein, the access stratum context may be stored at the secondary node.

In some examples of the method, apparatuses, and non-transitory computer-readable medium described herein, verifying the UE using the access stratum context may include operations, features, means, or instructions for verifying the UE at the secondary node, where the access stratum context may be stored at the secondary node.

In some examples of the method, apparatuses, and non-transitory computer-readable medium described herein, resuming communications with the UE may include operations, features, means, or instructions for communicating with an access mobility function to transition the first base station from the secondary node to the master node, and communicating with the UE as the master node. Some examples of the method, apparatuses, and non-transitory computer-readable medium described herein may further include operations, features, means, or instructions for establishing a third base station as a new secondary node.

Some examples of the method, apparatuses, and non-transitory computer-readable medium described herein may further include operations, features, means, or instructions for receiving data forwarded from the second base station using a temporary data radio bearer or a split radio bearer.

Some examples of the method, apparatuses, and non-transitory computer-readable medium described herein may further include operations, features, means, or instructions for transmitting, to the UE, an indication of an RRC configuration, and receiving, from the UE, an indication of an RRC connection with the first base station, where the first base station may be connected as the new master node in the dual connectivity deployment.

Some examples of the method, apparatuses, and non-transitory computer-readable medium described herein may further include operations, features, means, or instructions for transmitting, to the second base station, a request to resume upper layer communications based on the request to resume communications from the UE, receiving, from the second base station, an acknowledgement of the request to resume upper layer communications, and transmitting, to the UE, an indication to resume RRC communications.

Some examples of the method, apparatuses, and non-transitory computer-readable medium described herein may further include operations, features, means, or instructions for splitting a signaling radio bearer into a first portion associated with the first base station and a second portion associated with the second base station, where the indication to resume RRC communications may be transmitted via the first portion of the signaling radio bearer.

In some examples of the method, apparatuses, and non-transitory computer-readable medium described herein, the acknowledgement includes an indication of a suspension of a lower layer.

In some examples of the method, apparatuses, and non-transitory computer-readable medium described herein, the indication to resume RRC communications includes an indication of a suspension of a lower layer of a secondary cell group associated with the first base station based on the acknowledgement.

Some examples of the method, apparatuses, and non-transitory computer-readable medium described herein may further include operations, features, means, or instructions for identifying a measurement configuration associated with the second base station or with a radio access network (RAN), where the indication to resume RRC communications includes the measurement configuration.

Some examples of the method, apparatuses, and non-transitory computer-readable medium described herein may further include operations, features, means, or instructions for receiving, from the UE, a measurement report associated with the second base station, where the measurement report corresponds to the measurement configuration, transmitting, to the second base station, a request to resume lower layer communications, and receiving, from the second base station, an acknowledgement of the request to resume lower layer communications.

Some examples of the method, apparatuses, and non-transitory computer-readable medium described herein may further include operations, features, means, or instructions for receiving a second measurement report on a first RAN from the UE before receiving the request to resume communications, and identifying, based on receiving the measurement report, that the measurement report may be associated with a second RAN different than the first RAN, where transitioning from the secondary node to the master node and establishing a new secondary node may be based on identifying that the measurement report may be associated with the second RAN.

Some examples of the method, apparatuses, and non-transitory computer-readable medium described herein may further include operations, features, means, or instructions for identifying that a measurement report associated with the second base station may have not been received from the UE, and transmitting, to the second base station, a request to release the second base station from the dual connectivity deployment with the UE.

In some examples of the method, apparatuses, and non-transitory computer-readable medium described herein, resuming communications with the UE may include operations, features, means, or instructions for maintaining the first base station as the secondary node in the dual connectivity deployment, and communicating with the UE as the secondary node.

Some examples of the method, apparatuses, and non-transitory computer-readable medium described herein may further include operations, features, means, or instructions for transmitting, to the second base station, an indication of a signaling radio bearer configuration associated with the first base station and an indication of a lower layer configuration associated with a secondary cell group.

Some examples of the method, apparatuses, and non-transitory computer-readable medium described herein may further include operations, features, means, or instructions for receiving, from the second base station, an RRC container including the indication of the signaling radio bearer configuration associated with the first base station, an indication of a second signaling radio bearer configuration associated with the second base station, and the indication of the lower layer configuration associated with the secondary cell group.

In some examples of the method, apparatuses, and non-transitory computer-readable medium described herein, the RRC container includes an indication of a lower layer configuration associated with a master cell group.

In some examples of the method, apparatuses, and non-transitory computer-readable medium described herein, the RRC container includes a measurement configuration.

Some examples of the method, apparatuses, and non-transitory computer-readable medium described herein may further include operations, features, means, or instructions for storing, before receiving the request from the UE, the access stratum context for the UE at the first base station.

In some examples of the method, apparatuses, and non-transitory computer-readable medium described herein, the access stratum context includes a radio bearer configuration, a resume identity, a RAN paging cycle, a RAN notification area associated with a first RAT and a second RAT, a periodic timer, a next hop chaining control parameter (NCC) and corresponding secondary node key (S-kgNB), a measurement associated with the first base station, and a measurement associated with the second base station.

Some examples of the method, apparatuses, and non-transitory computer-readable medium described herein may further include operations, features, means, or instructions for reconfiguring, before receiving the request from the UE, a split bearer or a temporary data radio bearer for communication with the UE.

Some examples of the method, apparatuses, and non-transitory computer-readable medium described herein may further include operations, features, means, or instructions for adding one or more temporary data radio bearers to the first base station for forwarding data between the first base station and the second base station, where the one or more temporary data radio bearers correspond to one or more data radio bearers that may be terminated at the second base station.

In some examples of the method, apparatuses, and non-transitory computer-readable medium described herein, the first base station and the second base station operate on different carrier frequencies.

A method of wireless communication at a UE is described. The method may include identifying that the UE is in a radio resource control (RRC) inactive state and is to resume communications in a dual connectivity deployment, and transmitting, to a first base station that is a secondary node in the dual connectivity deployment, a request to resume communications with the first base station and a second base station that is a master node in the dual connectivity deployment. The method may include receiving, from the first base station, an indication of an RRC configuration, transitioning directly from the RRC inactive state to an RRC connected state based on the RRC configuration, and resuming communications with at least the first base station in the RRC connected state.

An apparatus for wireless communication at a UE is described. The apparatus may include a processor, memory in electronic communication with the processor, and instructions stored in the memory. The instructions may be executable by the processor to cause the apparatus to identify that the UE is in a radio resource control (RRC) inactive state and is to resume communications in a dual connectivity deployment, and transmit, to a first base station that is a secondary node in the dual connectivity deployment, a request to resume communications with the first base station and a second base station that is a master node in the dual connectivity deployment. The instructions may be executable by the processor to cause the apparatus to receive, from the first base station, an indication of an RRC configuration, transition directly from the RRC inactive state to an RRC connected state based on the RRC configuration, and resume communications with at least the first base station in the RRC connected state.

Another apparatus for wireless communication at a UE is described. The apparatus may include means for identifying that the UE is in a radio resource control (RRC) inactive state and is to resume communications in a dual connectivity deployment, and transmitting, to a first base station that is a secondary node in the dual connectivity deployment, a request to resume communications with the first base station and a second base station that is a master node in the dual connectivity deployment. The apparatus may include means for receiving, from the first base station, an indication of an RRC configuration, transitioning directly from the RRC inactive state to an RRC connected state based on the RRC configuration, and resuming communications with at least the first base station in the RRC connected state.

A non-transitory computer-readable medium storing code for wireless communication at a UE is described. The code may include instructions executable by a processor to identify that the UE is in a radio resource control (RRC) inactive state and is to resume communications in a dual connectivity deployment, and transmit, to a first base station that is a secondary node in the dual connectivity deployment, a request to resume communications with the first base station and a second base station that is a master node in the dual connectivity deployment. The code may include instructions executable by a processor to receive, from the first base station, an indication of an RRC configuration, transition directly from the RRC inactive state to an RRC connected state based on the RRC configuration, and resume communications with at least the first base station in the RRC connected state.

In some examples of the method, apparatuses, and non-transitory computer-readable medium described herein, transitioning directly from the RRC inactive state to the RRC connected state may include operations, features, means, or instructions for transitioning from the RRC inactive state to the RRC connected state without entering an RRC idle state.

In some examples of the method, apparatuses, and non-transitory computer-readable medium described herein, resuming communications with at least the first base station may include operations, features, means, or instructions for resuming communications with the first base station as the master node.

In some examples of the method, apparatuses, and non-transitory computer-readable medium described herein, resuming communications with at least the first base station may include operations, features, means, or instructions for resuming communications with a third base station as a new secondary node.

In some examples of the method, apparatuses, and non-transitory computer-readable medium described herein, resuming communications with at least the first base station may include operations, features, means, or instructions for resuming communications with the first base station as the secondary node.

Some examples of the method, apparatuses, and non-transitory computer-readable medium described herein may further include operations, features, means, or instructions for receiving, from the first base station, an indication of a suspension of a lower layer of a secondary cell group associated with the second base station.

Some examples of the method, apparatuses, and non-transitory computer-readable medium described herein may further include operations, features, means, or instructions for receiving, from the first base station, an indication to resume RRC communications via a portion of a signaling radio bearer associated with the first base station.

Some examples of the method, apparatuses, and non-transitory computer-readable medium described herein may further include operations, features, means, or instructions for receiving, from the first base station, an indication of a measurement configuration associated with the second base station, and transmitting, to the first base station, a measurement report associated with the second base station, where the measurement report may be based on the indication of the measurement configuration associated with the second base station.

Some examples of the method, apparatuses, and non-transitory computer-readable medium described herein may further include operations, features, means, or instructions for performing a measurement based on a stored measurement configuration, where the measurement may be performed before entering the RRC inactive state.

A method of wireless communication at a first base station is described. The method may include identifying that the first base station is a secondary node for a UE operating in a dual connectivity deployment, where the UE is in a radio resource control (RRC) inactive state, receiving, from a user plane function (UPF), an indication of downlink data for the UE, and initiating a paging operation for the UE.

An apparatus for wireless communication at a first base station is described. The apparatus may include a processor, memory in electronic communication with the processor, and instructions stored in the memory. The instructions may be executable by the processor to cause the apparatus to identify that the first base station is a secondary node for a UE operating in a dual connectivity deployment, where the UE is in a radio resource control (RRC) inactive state, receive, from a user plane function (UPF), an indication of downlink data for the UE, and initiate a paging operation for the UE.

Another apparatus for wireless communication at a first base station is described. The apparatus may include means for identifying that the first base station is a secondary node for a UE operating in a dual connectivity deployment, where the UE is in a radio resource control (RRC) inactive state, receiving, from a user plane function (UPF), an indication of downlink data for the UE, and initiating a paging operation for the UE.

A non-transitory computer-readable medium storing code for wireless communication at a first base station is described. The code may include instructions executable by a processor to identify that the first base station is a secondary node for a UE operating in a dual connectivity deployment, where the UE is in a radio resource control (RRC) inactive state, receive, from a user plane function (UPF), an indication of downlink data for the UE, and initiate a paging operation for the UE.

In some examples of the method, apparatuses, and non-transitory computer-readable medium described herein, initiating the paging operation for the UE may include operations, features, means, or instructions for transmitting a RAN paging request to a second base station that may be a master node for the dual connectivity deployment, where the first base station may be associated with a first RAT and the second base station may be associated with a second RAT, receiving an indication of RAN paging from the second base station, and paging the UE based on the indication of RAN paging.

In some examples of the method, apparatuses, and non-transitory computer-readable medium described herein, initiating the paging operation for the UE may include operations, features, means, or instructions for transmitting an indication of RAN paging to a first RAN and to a second base station that may be a master node for the dual connectivity deployment, where, the first base station may be associated with a first RAT and the second base station may be associated with a second RAT, transmitting the indication of RAN paging causes the first RAN and the second base station to page the UE, and paging the UE.

In some examples of the method, apparatuses, and non-transitory computer-readable medium described herein, initiating the paging operation may include operations, features, means, or instructions for identifying an access context stored at the first base station for the UE.

DETAILED DESCRIPTION

Figure 1:
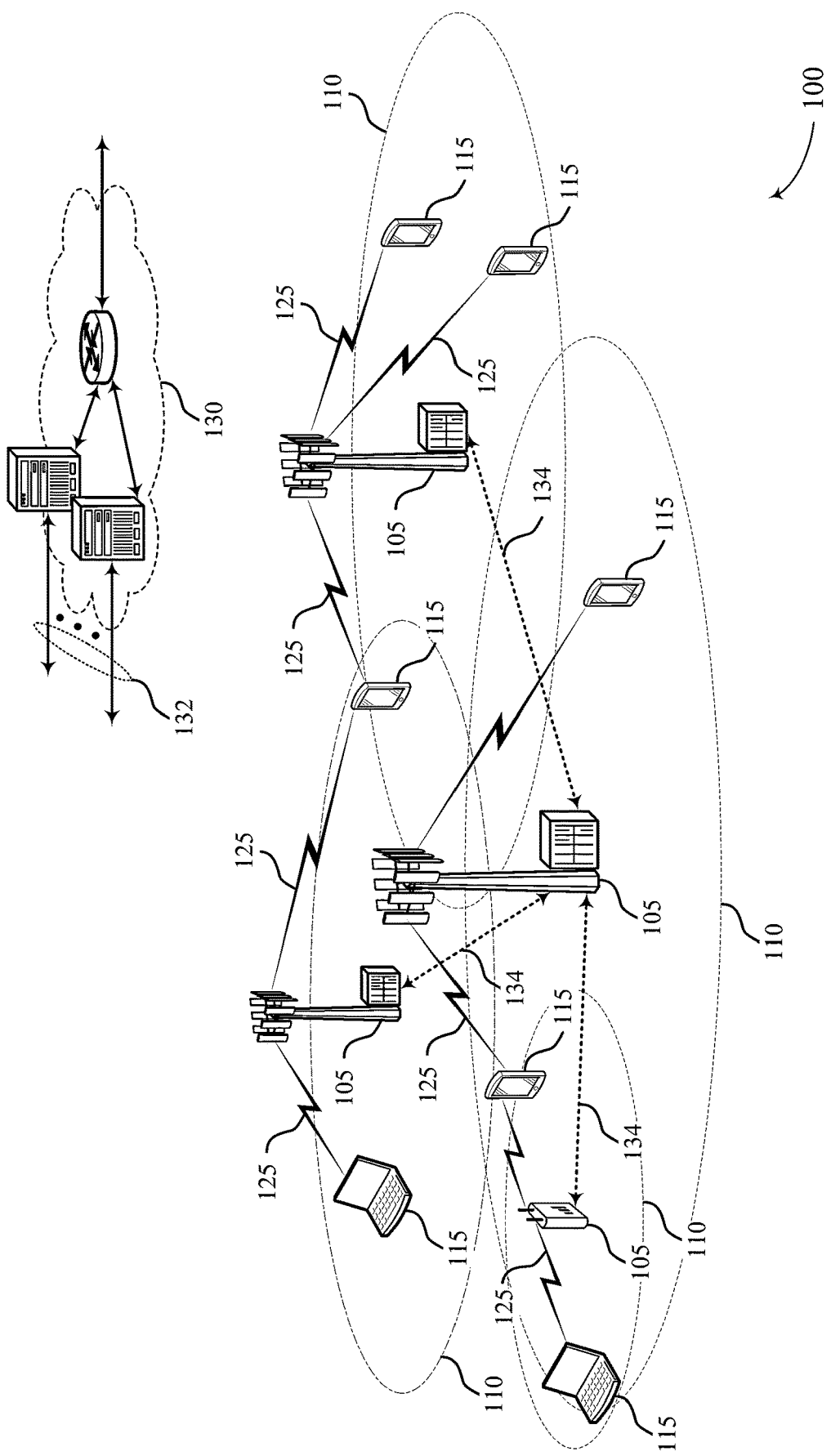
FIG. 1 illustrates an example of a system for wireless communications that supports resuming communication with a secondary node in dual connectivity in accordance with aspects of the present disclosure.

In some examples of a wireless communications systems, a user equipment (UE) may be simultaneously connected with a first base station and a second base station (e.g., through dual connectivity (DC) communications), and may consume resources allocated by both base stations. The first and second base stations may be referred to as a master node (MN) and secondary node (SN). The MN may be a base station that is responsible for managing handover signaling, paging, and bearer setup/release procedures, for example. The SN may be a base station that provides additional resources to the UE but may not perform the management functions of the MN. The MN and SN may operate on different carrier frequencies and may communicate with the UE via the same or different radio access technologies (RATs), such as via a long term evolution (LTE) RAT or a new radio (NR) RAT. In some cases, a UE may first establish a connection with an MN, and then establish communications with (e.g., use additional resources from) the SN.

In general, a UE may establish communications with a base station by exchanging radio resource control (RRC) signaling that configures, for example, the resources over which the UE may communicate with the base station. Once the UE has established communications with a base station, the UE may enter an RRC connected state, meaning that the UE is connected with the base station and is capable of communicating with the base station. In some LTE wireless communication systems, the UE may, at times, enter an RRC idle state, during which the UE may not communicate with a base station. In this case, to resume communications and re-enter the RRC connected state, the UE may repeat some or all of the signaling used to initially enter the RRC connected state. Thus, the signaling overhead required to resume communications after entering the RRC idle state may be similar to (or the same as) the signaling required to establish initial communications.

In some cases, in addition to supporting an RRC connected state and an RRC idle state, a UE may be configured to support an RRC inactive state. As described herein, in some cases, in a DC deployment, the UE may temporarily suspend communications with one or both base stations (e.g., the MN or SN) by entering the RRC inactive state, during which the connection established between the UE and the base stations may be maintained but may not be actively used for communication. Entering the RRC inactive state may enable a UE to conserve power by refraining from communicating with the base station for a period of time.

In some cases, a UE may subsequently initiate signaling, while in the RRC inactive state, to resume communications with the SN in a DC deployment; e.g., the UE may transition directly from the RRC inactive state to the RRC connected state without entering the RRC idle state.

In some cases, an access stratum (AS) context for the UE may be stored at the SN or the MN to enable the SN or MN to quickly resume communications with the UE from the RRC inactive state without exchanging the full set of signaling required to resume communications from an RRC idle state. The AS context for a UE may include, for example, information related to the DC deployment (such as radio bearer configurations for the MN and SN) and information that is related to other aspects of the connection or the UE, such as an inactive-state radio network temporary identifier (e.g., an I-RNTI) used to identify the UE, a radio access network (RAN) paging cycle, and inactive state measurement configurations for the MN and SN, among other types of information.

Resuming communication with the SN without the UE entering the RRC idle state may provide several benefits. For example, resuming communications from the RRC inactive state (rather than from the RRC idle state) as described herein may reduce the signaling overhead involved in resuming communications, which may, in turn, reduce the latency associated with resuming communications. In some cases, resuming communications from the RRC inactive state as described herein may enable faster establishment of a DC deployment, and enable a secondary RAT (e.g., a RAT associated with the SN) to be utilized as much as possible (instead of primarily resuming with only the MN and the RAT associated with the MN).

In some cases, when the UE resumes communications with the SN and transitions to the RRC connected state, the SN may either remain as the SN in the DC deployment or the SN may become the new MN in the DC deployment. In the latter case, the old MN (e.g., the MN before communications were suspended and the UE entered the RRC inactive state) may be released from the DC deployment. In either case (e.g., whether the SN remains the SN or becomes a new MN), the mapping between the quality of service (QoS) flow and the dedicated radio bearers (DRB) for both the MN and the SN may remain unchanged after resumption, such that protocol data unit (PDU) sessions need not be switched—thereby avoiding the need to switch user plane termination points (e.g., N3 points). In addition, if the SN remains the SN, the control plane termination points (e.g., N2 points) may also remain unchanged. Thus, the suspend and resume operations may require less switching signaling and may be transparent to the core network.

Aspects of the disclosure are initially described in the context of a wireless communications system. Aspects of the disclosure are further illustrated by and described with reference to process flows, apparatus diagrams, system diagrams, and flowcharts that relate to resuming communication with an SN in a dual connectivity deployment.

FIG. 1 illustrates an example of a wireless communications system 100 that supports resuming communication with a secondary node in dual connectivity in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, an enhanced LTE (eLTE) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, wireless communications system 100 may include a first base station 105 that may operate in a first RAT and a second base station 105 that may operate in a second RAT, where the second RAT may be different from the first RAT. Alternatively, both base stations 105 may operate in the same RAT. In either case, a UE 115 may be configured to communicate with cells on the first base station 105 and the second base station 105 (e.g., dual connectivity). For example, the UE 115 may be configured to receive and transmit data with a first cell on the first base station 105 while receiving or transmitting different or related data with a second cell on the second base station 105. In some cases, the first cell on the first base station 105 may be associated with a secondary cell group (SCG), and the second cell on the second base station 105 may be associated with a master cell group (MCG), where the UE 115 may receive control information (e.g., RRC information) from the second cell (e.g., the master cell group). Thus, the first base station 105 may be an SN and the second base station 105 may be an MN.

As described herein, a UE 115 may temporarily suspend communications with the SN (e.g., the first base station 105) and the MN (e.g., the second base station 105) by entering an RRC inactive state. The UE may subsequently resume communications with the SN by transitioning to the RRC connected state without entering the RRC idle state. The UE 115 may initiate resumption of communications by transmitting a request to resume communications, or the SN or MN may initiate resumption of communications by paging the UE 115. In some cases, the AS context for the UE 115 may be stored at the SN or at the MN to enable the SN or MN to verify the UE 115 when the UE 115 resumes communications.

In some cases, when the UE 115 resumes communications with the SN, the SN remains the SN in the DC deployment. In other cases, the SN may become the new MN, and the old MN may be released. In the latter case, a third base station 105 may be added to the DC deployment as a new SN. Wireless communications system 100 may support efficient techniques for resuming communications in a DC deployment after a UE 115 has entered an RRC inactive state.

One or more of the base stations 105 may include a base station communications manager, which may identify that the base station is an SN for a UE operating in a dual connectivity deployment, where the UE is in an RRC inactive state. The base station communications manager may receive, from the UE, a request to resume communications with the first base station and a second base station that is an MN in the dual connectivity deployment. The base station communications manager may verify the UE using an access stratum context associated with the UE, and resume communications with the UE based at least in part on the request and the access stratum context. In some cases, the base station communication manager may receive, from a user plane function (UPF), an indication of downlink data for the UE, and initiate a paging operation for the UE.

UEs 115 may include a UE communications manager, which may identify that the UE is in an RRC inactive state and is to resume communications in a dual connectivity deployment. The UE communications manager may transmit, to a first base station that is an SN in the dual connectivity deployment, a request to resume communications with the first base station and a second base station that is an MN in the dual connectivity deployment. The UE communications manager may receive, from the first base station, an indication of an RRC configuration, and transition directly from the RRC inactive state to an RRC connected state based at least in part on the RRC configuration. The UE communications manager may resume communications with at least the first base station in the RRC connected state.

Figure 2:
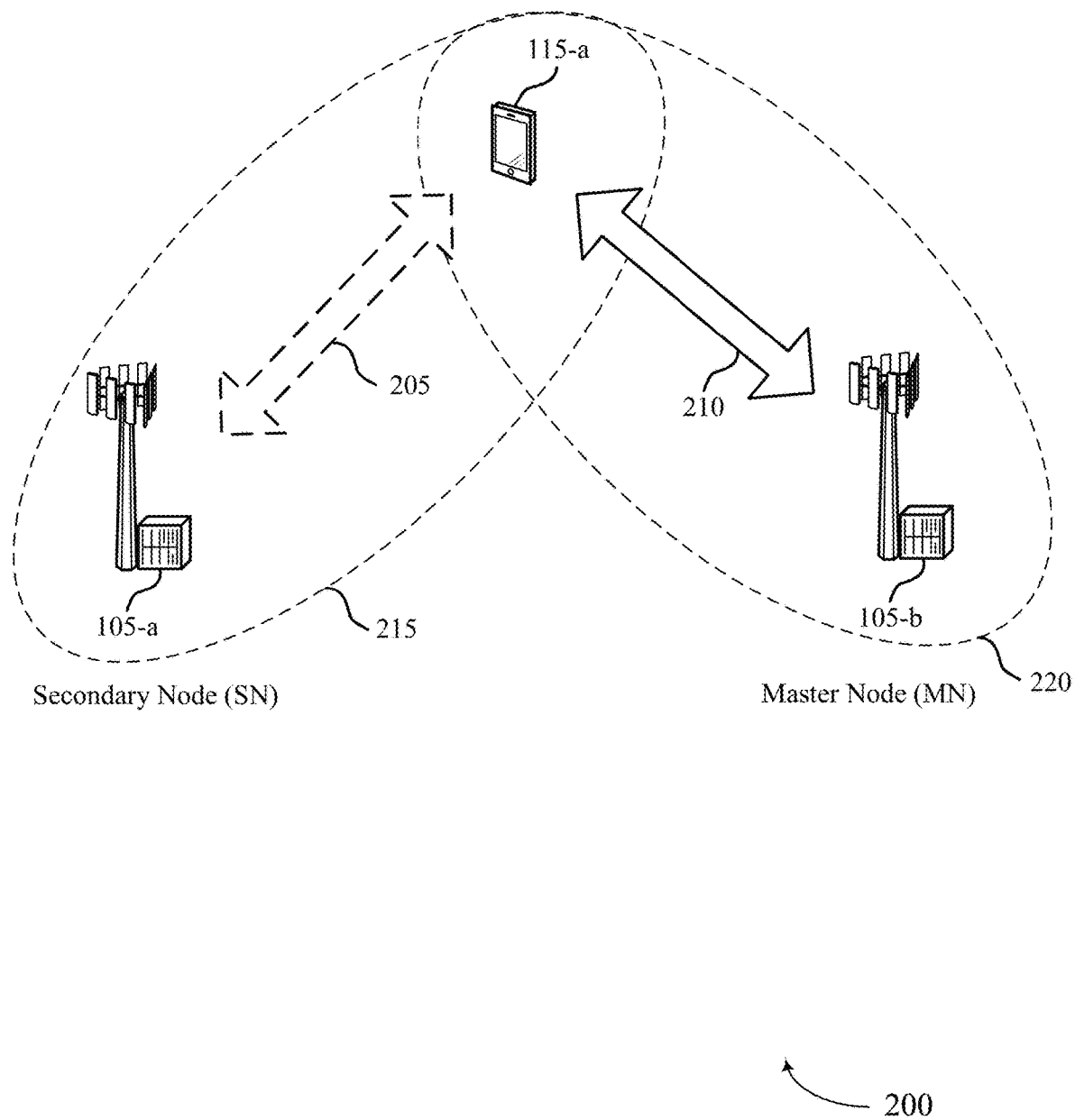
FIG. 2 illustrates an example of a system for wireless communications that supports resuming communication with a secondary node in dual connectivity in accordance with aspects of the present disclosure.

FIG. 2 illustrates an example of a wireless communications system 200 that supports resuming communication with a secondary node in a dual connectivity deployment in accordance with various aspects of the present disclosure. In some examples, wireless communications system 200 may implement aspects of wireless communications system 100. Wireless communications system 200 may include base station 105-a, base station 105-b, and UE 115-a, which may be examples of base stations 105 and UEs 115 as described herein with reference to FIG. 1. Base station 105-a may be an SN in a DC deployment with UE 115-a, and base station 105-b may be an MN in a DC deployment with UE 115-a. Base station 105-a may be associated with an SCG having a first coverage area 215 and base station 105-b may be associated with an MCG having a second coverage area 220.

UE 115-a may be configured to operate in the DC deployment to communicate with base station 105-a and base station 105-b simultaneously. In some cases, UE 115-a may be configured to communicate with base station 105-a on a secondary serving cell on a secondary carrier 205 and to communicate with base station 105-b on a master serving cell on a master carrier 210.

Base station 105-b may be a base station that terminates at the S1-MME interface (e.g., an interface between the base station and the mobile management entity (MME)) and may be responsible for managing handover signaling, paging, and bearer setup/release procedures for communications with UE 115-a, for example. Base station 105-a may be a base station that provides additional resources to the UE but may not perform the management functions of base station 105-b. Base station 105-a and base station 105-b may operate on different carrier frequencies and may communicate with the UE via the same or different RATs, such as via an LTE RAT or a NR RAT. Base station 105-a and base station 105-b may communicate with each other via backhaul links, such as Xn.

As described herein, base station 105-a may identify that base station 105-a is an SN for a UE 115-a operating in a DC deployment, where UE 115-a is in an RRC inactive state. Base station 105-a may receive, from UE 115-a, a request to resume communications with base station 105-a and base station 105-b. Base station 105-a may verify UE 115-a using an access stratum context associated with UE 115-a, and may resume communications with UE 115-a as either an SN or as an MN. In the latter case, base station 105-a may release base station 105-b from the DC deployment.

Figure 3:
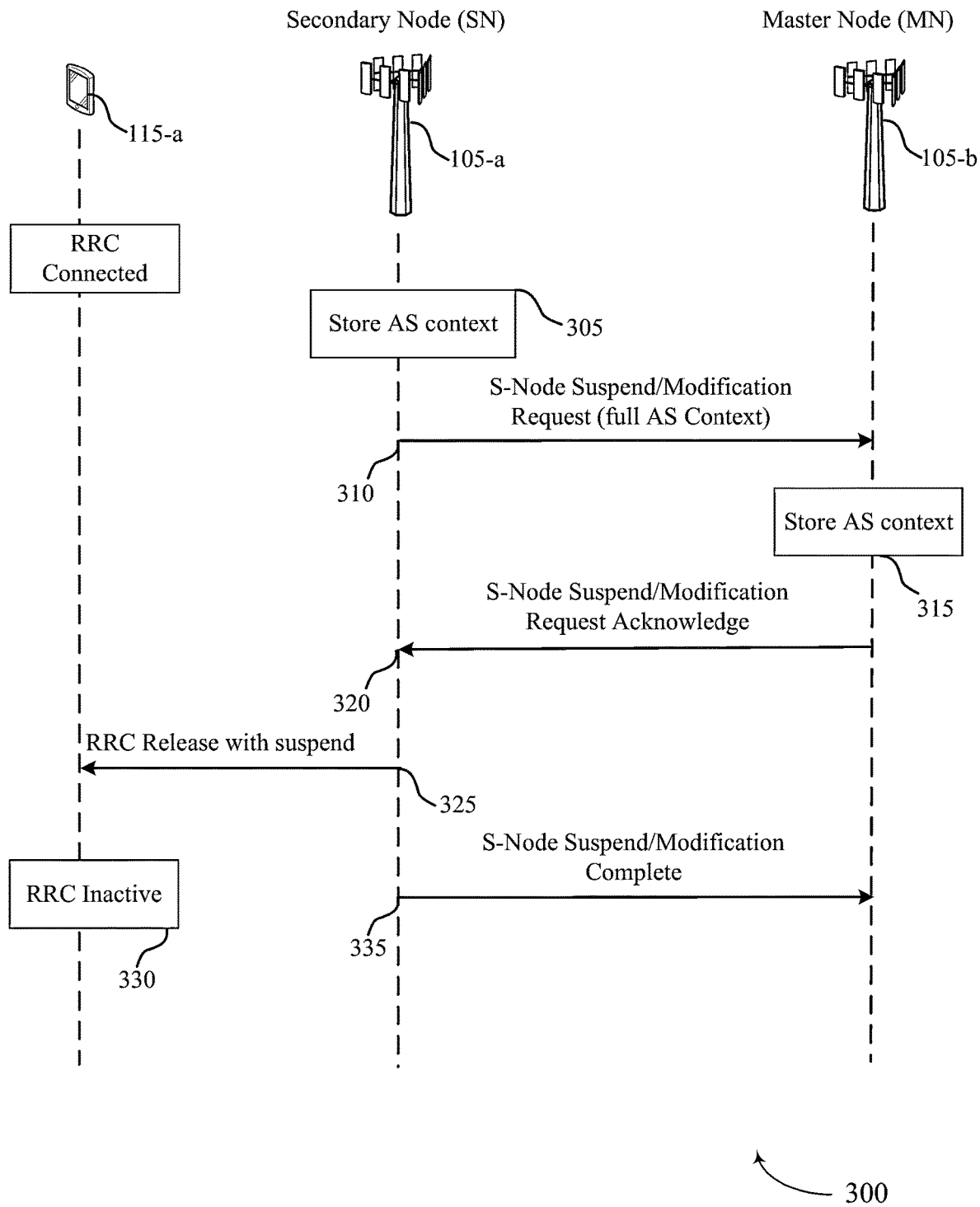
FIG. 3 illustrates an example of a process flow that supports resuming communication with a secondary node in dual connectivity in accordance with aspects of the present disclosure.

FIG. 3 illustrates an example of a process flow 300 that supports resuming communication with a secondary node in dual connectivity in accordance with aspects of the present disclosure. In some examples, process flow 300 may implement aspects of wireless communications systems 100 and 200. Process flow 300 may include UE 115-a, a first base station 105-a (e.g., an SN in a DC deployment with UE 115-a), and a second base station 105-b (e.g., an MN in the DC deployment with UE 115-a), which may be examples of UEs 115 and base stations 105 as described herein with reference to FIGS. 1 and 2.

In the following description of the process flow 300, the operations between UE 115-a, base station 105-a, and base station 105-b may be performed in different orders or at different times. Some operations may also be left out of the process flow 300, or other operations may be added to the process flow 300. It is to be understood that while UE 115-a is shown performing a number of the operations of process flow 300, any wireless device may perform the operations shown.

In some cases, UE 115-*a* may initially be operating in an RRC connected state, having previously established communications with base station 105-*a* and base station 105-*b* in a DC deployment. Process flow 300 may depict a process by which a UE 115-*a* subsequently suspends communications with base station 105-*a* and base station 105-*b* and enters an RRC inactive state.

At 305, base station 105-*a* may store the AS context for UE 115-*a* at base station 105-*a*. At 310, base station 105-*a* may transmit a request to suspend communications with UE 115-*a* to base station 105-*b*. In some examples, the request to suspend communications may include the AS context for UE 115-*a*. At 315, base station 105-*b* may store the AS context for UE 115-*a*. At 320, base station 105-*a* may receive, from base station 105-*b*, an acknowledgement of the request to suspend communications.

At 325, base station 105-*a* may transmit, to UE 115-*a*, an indication of a suspension of communications. In some cases, the indication of suspension of communications may include an RRC release with suspend. In some cases, a suspend operation may include split bearer reconfiguration or a temporary data radio bearer added in the SN or MN for each data radio bearer terminated at the other node (MN or SN).

At 330, UE 115-*a* may enter an RRC inactive state, based on the indication of the suspension of communications. While the UE 115-*a* is in the RRC inactive state, UE 115-*a* may refrain from transmitting signals to base station 105-*a* or base station 105-*b*. UE 115-*a* may, however, intermittently monitor communication resources for signals transmitted from base station 105-*a* or base station 105-*b*, such as paging signals, for example.

At 335, base station 105-*a* may transmit, to base station 105-*b*, an indication that the suspension is complete. As discussed herein with reference to FIGS. 3 through 19, UE 115-*a* may subsequently resume communications with base station 105-*a* or base station 105-*b* without transitioning into an RRC idle state. UE 115-*a* may resume communications with base station 105-*a* by initiating a resume procedure (e.g., by transmitting a request to resume communications) in response to identifying information to be transmitted or in response to being paged (e.g., by base station 105-*a* or base station 105-*b*).

Figure 4:
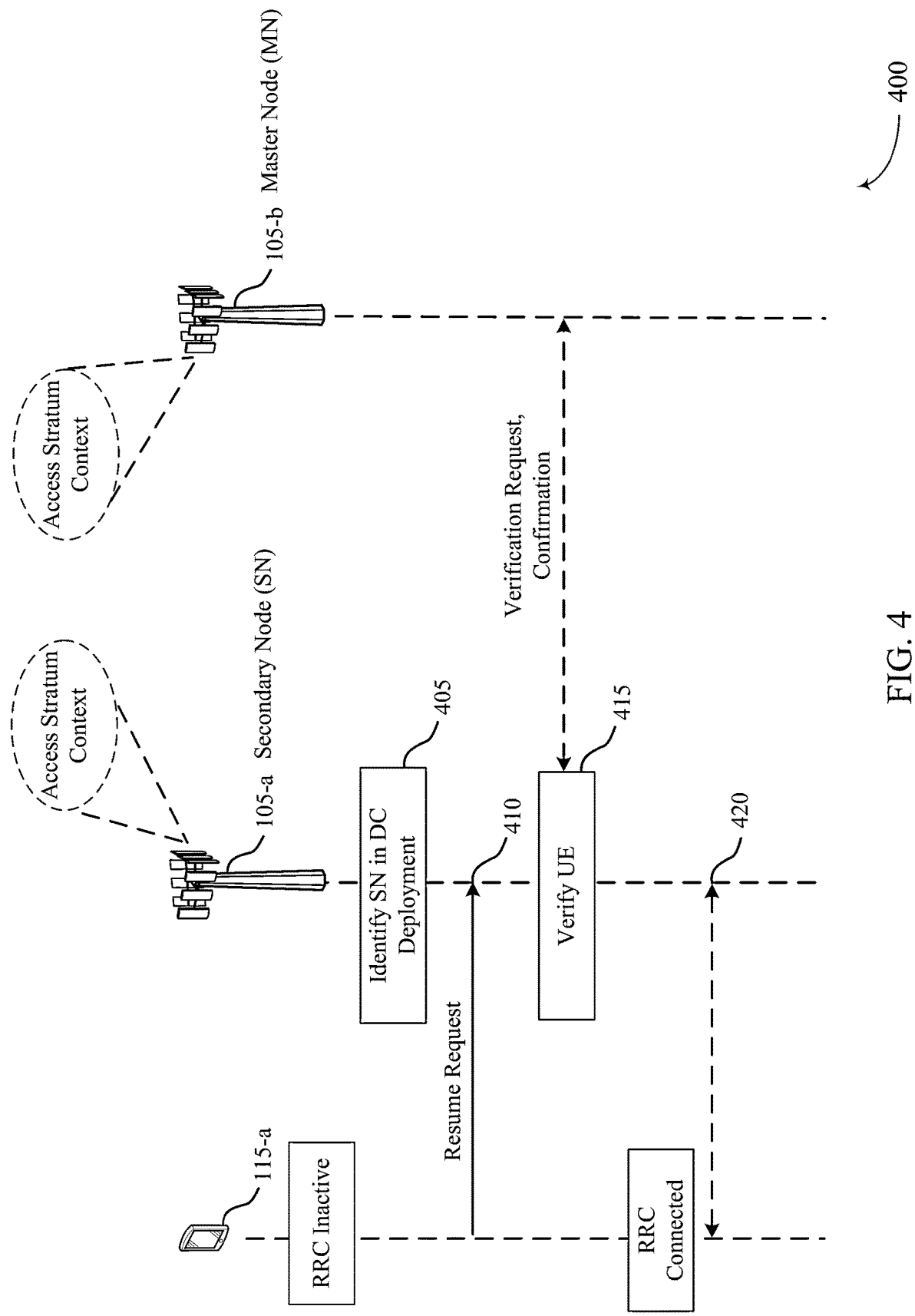
FIG. 4 illustrates an example of a process flow that supports resuming communication with a secondary node in dual connectivity in accordance with aspects of the present disclosure.

FIG. 4 illustrates an example of a process flow 400 that supports resuming communication with a secondary in dual connectivity in accordance with aspects of the present disclosure. In some examples, process flow 400 may implement aspects of wireless communications systems 100 and 200. Process flow 400 may include UE 115-*a-b*, a first base station 105-*a* (e.g., an SN in a DC deployment with UE 115-*a*), and a second base station 105-*b* (e.g., an MN in the DC deployment with UE 115-*a*), which may be examples of UEs 115 and base stations 105 as described herein with reference to FIGS. 1 and 2.

In the following description of the process flow 400, the operations between UE 115-*a*, base station 105-*a*, and base station 105-*b* may be performed in different orders or at different times. Some operations may also be left out of the process flow 400, or other operations may be added to the process flow 400. It is to be understood that while UE 115-*a* is shown performing a number of the operations of process flow 400, any wireless device may perform the operations shown.

In some cases, UE 115-*a* may initially be operating in an RRC inactive state, having previously established and then suspended communications with base station 105-*a* and base station 105-*b* in a DC deployment. At 405, base station 105-*a* may identify that base station 105-*a* is an SN for the UE 115-*a* operating in a DC deployment, where the UE 115-*a* is operating in an RRC inactive state. In some cases, the base station 105-*a* may identify that base station 105-*a* is the SN for the UE 115-*a* based on configuration information stored at base station 105-*a*, for example.

At 410, base station 105-*a* may receive, from UE 115-*a*, a request to resume communications with base station 105-*a* and base station 105-*b*. In some cases, the request to resume communications may be an RRC resume request, which may be received by base station 105-*a* via RRC signaling. At 415, base station 105-*a* may verify UE 115-*a* using an access stratum context associated with UE 115-*a*. In some cases, the request to resume communications may include information regarding UE 115-*a*, and base station 105-*a* may verify that base station 105-*a* has access to access stratum context information for the UE 115-*a*. That is, in some cases, the SN may verify UE 115-*a* using access stratum context information stored at the SN.

In other cases, base station 105-*a* may verify UE 115-*a* by transmitting a verification request (e.g., including UE 115-*a* information received in the request to resume communications) to base station 105-*b*. Base station 105-*b* may verify UE 115-*a* using access stratum context for UE 115-*a* stored at base station 105-*b*. That is, in some cases, the SN may verify UE 115-*a* by requesting verification from the MN. In this case, base station 105-*b* may, after verifying UE 115-*a*, transmit a verification confirmation to base station 105-*a*.

In some cases, the access stratum context for UE 115-*a* may include information related to the DC deployment (such as radio bearer configurations for base station 105-*a* and base station 105-*b*) along with information that is related to other aspects of the connection or of UE 115-*a*, such as an inactive-state radio network temporary identifier (e.g., an I-RNTI) used to identify a UE that is operating in the RRC inactive state, a RAN paging cycle that specifies the timing of paging operations initiated by base station 105-*a* or base station 105-*b* to page UE 115-*a*, a RAN notification area that may include a coverage area for a RAT (e.g., NR or LTE) associated with base station 105-*a* and a RAT (e.g., NR or LTE) associated with base station 105-*b*, a periodic RAN notification area update (RNAU) timer, and a next hop chaining control parameter (NCC) and corresponding secondary node key (S-kgNB). The access stratum context may also include inactive state measurement configurations for base station 105-*a* and base station 105-*b*, which may configure UE 115-*a* to generate and transmit a measurement report that indicates the signal quality (or other metric) for cell groups associated with base station 105-*a* (e.g., a secondary cell group) or base station 105-*b* (e.g., a master cell group) while the UE 115-*a* is in the RRC inactive state. The timing, content, or format of the measurement report generated by UE 115-*a* may be configured by the inactive state measurement configurations.

At 420, base station 105-*a* may resume communication with UE 115-*a*, and UE 115-*a* may enter the RRC connected state. In some cases, UE 115-*a* may transition directly to the RRC connected state (e.g., without entering an RRC idle state) to resume communications with base station 105-*a*. In some cases, when base station 105-*a* resumes communication with UE 115-*a*, base station 105-*a* may resume communications as an SN in the DC deployment, and base station 105-*b* may remain an MN in the DC deployment. That is, in some cases, resuming communications with UE 115-*a* includes maintaining base station 105-*a* as the SN in the DC deployment, and communicating with UE 115-*a* as the SN.

In some cases, when base station 105-a resumes communication with UE 115-a, base station 105-a may resume communications as a new MN, and base station 105-b may be released from the DC deployment. In this case, resuming communications with UE 115-a includes communicating with UE 115-a as the MN. Additional details regarding various signaling associated with resuming communications with UE 115-a are described with reference to FIGS. 5 through 8.

Figure 5:
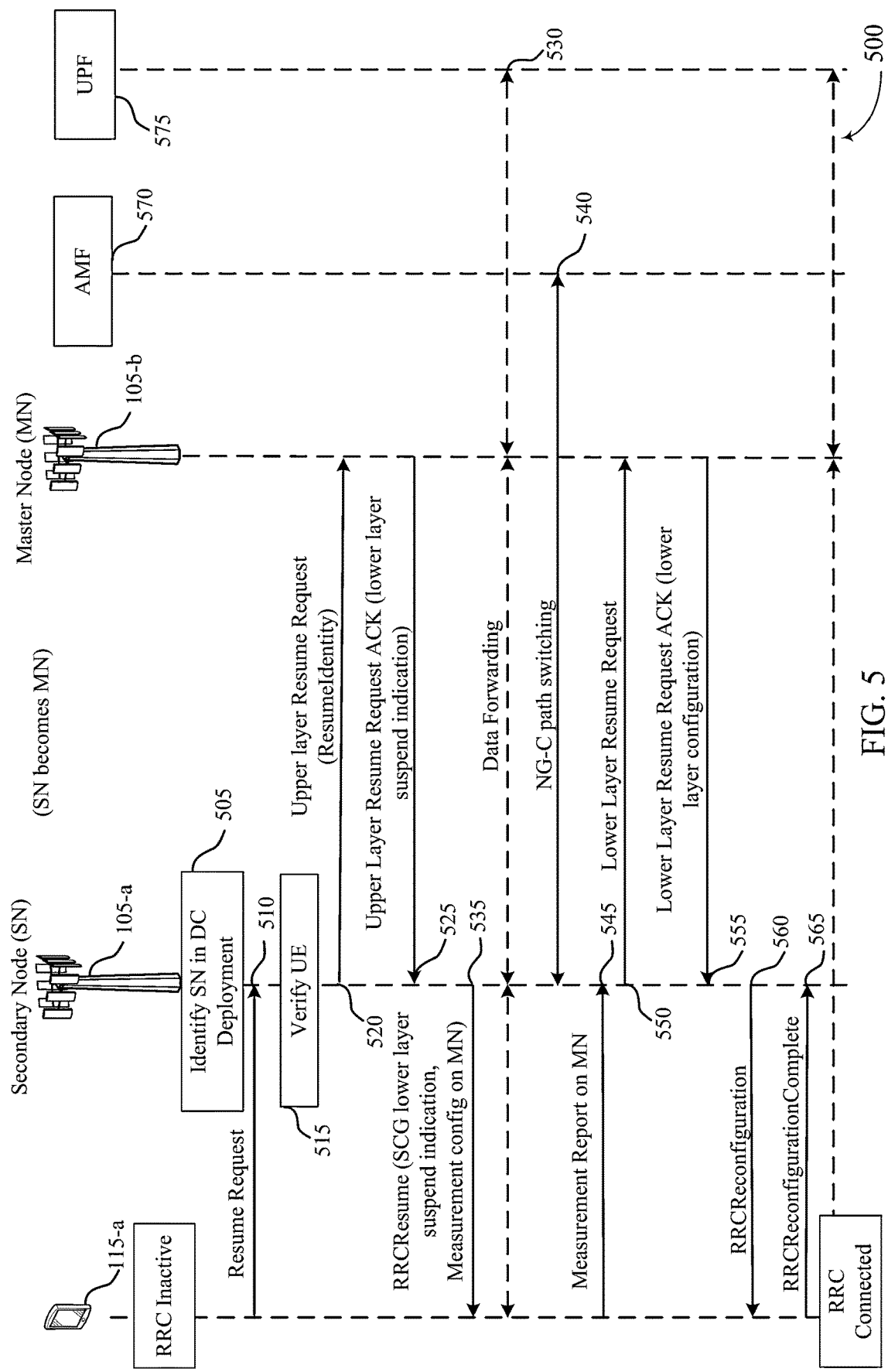
FIG. 5 illustrates an example of a process flow that supports resuming communication with a secondary node in dual connectivity in accordance with aspects of the present disclosure.

FIG. 5 illustrates an example of a process flow 500 that supports resuming communication with a secondary node in dual connectivity in accordance with aspects of the present disclosure. In some examples, process flow 500 may implement aspects of wireless communications systems 100 and 200. Process flow 500 may include UE 115-a, a first base station 105-a (e.g., an SN in a DC deployment with UE 115-a), a second base station 105-b (e.g., an MN in the DC deployment with UE 115-a), which may be examples of UEs 115 and base stations 105 as described herein with reference to FIGS. 1 and 2.

Process flow 500 may depict a scenario in which the SN (base station 105-a) becomes the new MN after resuming communications with UE 115-a, and the old MN (base station 105-b) is released from the DC deployment. In the following description of the process flow 500, the operations between UE 115-a, base station 105-a, and base station 105-b may be performed in different orders or at different times. Some operations may also be left out of the process flow 500, or other operations may be added to the process flow 500. It is to be understood that while UE 115-a is shown performing a number of the operations of process flow 500, any wireless device may perform the operations shown.

In some cases, UE 115-a may initially be operating in an RRC inactive state, having previously established and suspended communications with base station 105-a and base station 105-b in a DC deployment. At 505, base station 105-a may identify that base station 105-a is an SN for the UE 115-a operating in a DC deployment, where the UE 115-a is operating in an RRC inactive state. In some cases, the base station 105-a may identify that it is the SN for the UE 115-a based on configuration information stored at base station 105-a, for example.

At 510, base station 105-a may receive, from UE 115-a, a request to resume communications with base station 105-a and base station 105-b. In some cases, the request to resume communications may be an RRC resume request, which may be received by base station 105-a via RRC signaling. At 515, base station 105-a may verify UE 115-a using an access stratum context associated with UE 115-a. In some cases, the request to resume communications may include access stratum context information for UE 115-a, and base station 105-a may verify UE 115-a by identifying that the base station 105-a has access to an access stratum context for UE 115-a stored at base station 105-a. In some cases, base station 105-a may verify UE 115-a by requesting that base station 105-b verify UE 115-a.

At 520, base station 105-a may transmit a request to resume an upper layer communication (e.g., on a PDCP layer or RLC layer) to base station 105-b. In some cases, the request to resume an upper layer may include a resume identity associated with base station 105-a. At 525, base station 105-a may receive an acknowledgement, from base station 105-b, of the request to resume upper layer communications. In some cases, the acknowledgement may include an indication of a suspension of a lower layer (e.g., a MAC layer).

At 530, base station 105-b may forward any pending downlink signals (e.g., control or data signals that may have been received by base station 105-a prior to UE 115-a requesting to resume communications) to base station 105-a, which may in turn forward the signals to UE 115-a. Similarly, in some cases, pending uplink signals (e.g., control or data signals) may be forwarded from UE 115-a to base station 105-a, via base station 105-b. In some cases, base station 105-b may forward the downlink signals to base station 105-a via a temporary data radio bearer that is added to base station 105-a or via a leg (e.g., a portion) of a split radio bearer associated with base station 105-a.

In some cases, all DRBs may be configured such that all bearers have an SN leg. For example, to reconfigure MN terminated MCG bearer to MN terminated MCG split bearer. In some cases, temporary DRBs are added in SN for each DRB terminated at MN. For example, the SN may add temporary DRB on the SN die for downlink data forwarding from the MN side to the SN, and uplink data forwarding from SN to MN for each MN terminated MCG bearer. In some cases, such methods may be performed upon suspension or resumption.

At 535, base station 105-a may transmit an indication to resume RRC communications to UE 115-a. In some cases, the indication to resume RRC communications is transmitted to UE 115-a via the leg (e.g., a portion) of the split radio bearer associated with base station 105-a. In some cases, the indication to resume RRC communications may include an indication of a suspension of a lower layer associated with the SCG or a measurement configuration associated with base station 105-b or with a RAN associated with base station 105-b. In some cases, base station 105-a may configure the measurement configuration associated with base station 105-b.

At 540, base station 105-a may transmit, to an access management function (AMF) 570, an indication of a path switch; e.g., an indication of a next-generation core (NG-C) path switch. In some cases, the AMF 570 may control the mobility of UE 115-a by controlling, for example, which base stations 105 or RATs are connected with UE 115-a. In some cases, the indication of the path switch may be communicated from base station 105-a to AMF 570 to transition base station 105-a from being the SN in the DC deployment to be the new MN. Thus, at or after 540, base station 105-a may become the new MN for UE 115-a.

At 545, base station 105-a may, optionally, receive a measurement report from UE 115-a. In some cases, the measurement report may correspond to the measurement configuration transmitted to UE 115-a at 535 in the indication to resume RRC communications. In some cases, the measurement report may include an indication of a signal quality for a cell group, for example. In some cases, the measurement report may be associated with the old MN; e.g., with base station 105-b. That is, the measurement report may include measurements of the signal quality for a master cell group of the old MN.

In some cases, the measurement report from UE 115-a may be associated with a new RAN (e.g., the measurement report may be associated with measurements from a different RAN than the RAN used for receiving previous communications or measurement reports from UE 115-a). In this case, base station 105-a may release base station 105-b from the DC deployment by transmitting a release request (not shown) to base station 105. In some cases, base station 105-a may then add a third base station 105 as a new SN for the DC deployment. In this case, UE 115-a may transmit an SN addition request to the new RAN, and may receive an acknowledgement of the SN addition request from the new RAN. In addition, data for UE 115-*a* may be forwarded, via a portion of a split radio bearer, from base station 105-*b* to base station 105-*a*, and then to UE 115-*a*. If a temporary DRB solution is used, however, all traffic that is terminated at base station 105-*b* may be forwarded from base station 105-*b* to base station 105-*a* for data transmission, without the use of a split radio bearer.

In some cases, if base station 105-*a* does not receive a measurement report from UE 115-*a*, base station 105-*a* may release base station 105-*b* from the DC deployment by transmitting a release request to base station 105-*b*. In some cases, if base station 105-*a* releases base station 105-*b* from the DC deployment, base station 105-*a* may refrain from performing (e.g., skip) the processes described at 550 or 555, below.

At 550, base station 105-*a* may transmit, to base station 105-*b*, a request to resume lower layer communications. In response to receiving the request, in some cases, base station 105-*b* may resume lower layer communications using the measurement report received by base station 105-*a*. In some cases, base station 105-*b* may resume lower layer communications blindly; e.g., without using a measurement report. In some cases, resuming lower layer communications includes resuming communications with a user plane function (UPF) 575, which may be responsible for functions such as packet routing and forwarding and connection with a data network, for example.

At 555, base station 105-*a* may receive, from base station 105-*b*, an acknowledgement of the request to resume lower layer communications. In some cases, the acknowledgement may include a configuration of a lower layer. At 560, base station 105-*a* may transmit an RRC reconfiguration to UE 115-*a*. The RRC reconfiguration may include, for example, configuration information related to re-establishing communications between UE 115-*a* and base station 105-*a*, such as configuration information for establishing, modifying, or releasing radio bearers, performing a handover, configuring measurements, configuring cells, or other types of configuration information.

At 565, base station 105-*a* may receive an indication of an RRC reconfiguration complete from UE 115-*a*. The indication of the RRC reconfiguration complete may indicate, for example, that the UE 115-*a* has reconfigured (for example) radio bearers, cells, etc. based on the RRC configuration received from base station 105-*a*. In some cases, the indication of the RRC reconfiguration indicates that the UE 115-*a* has transitioned (or will transition) to the RRC connected state (e.g., without entering the RRC idle state). At or after 565, base station 105-*a* may resume communications with UE 115-*a* in the RRC connected state. In some cases, resuming communications may include performing a PDU session path update procedure.

Figure 6:
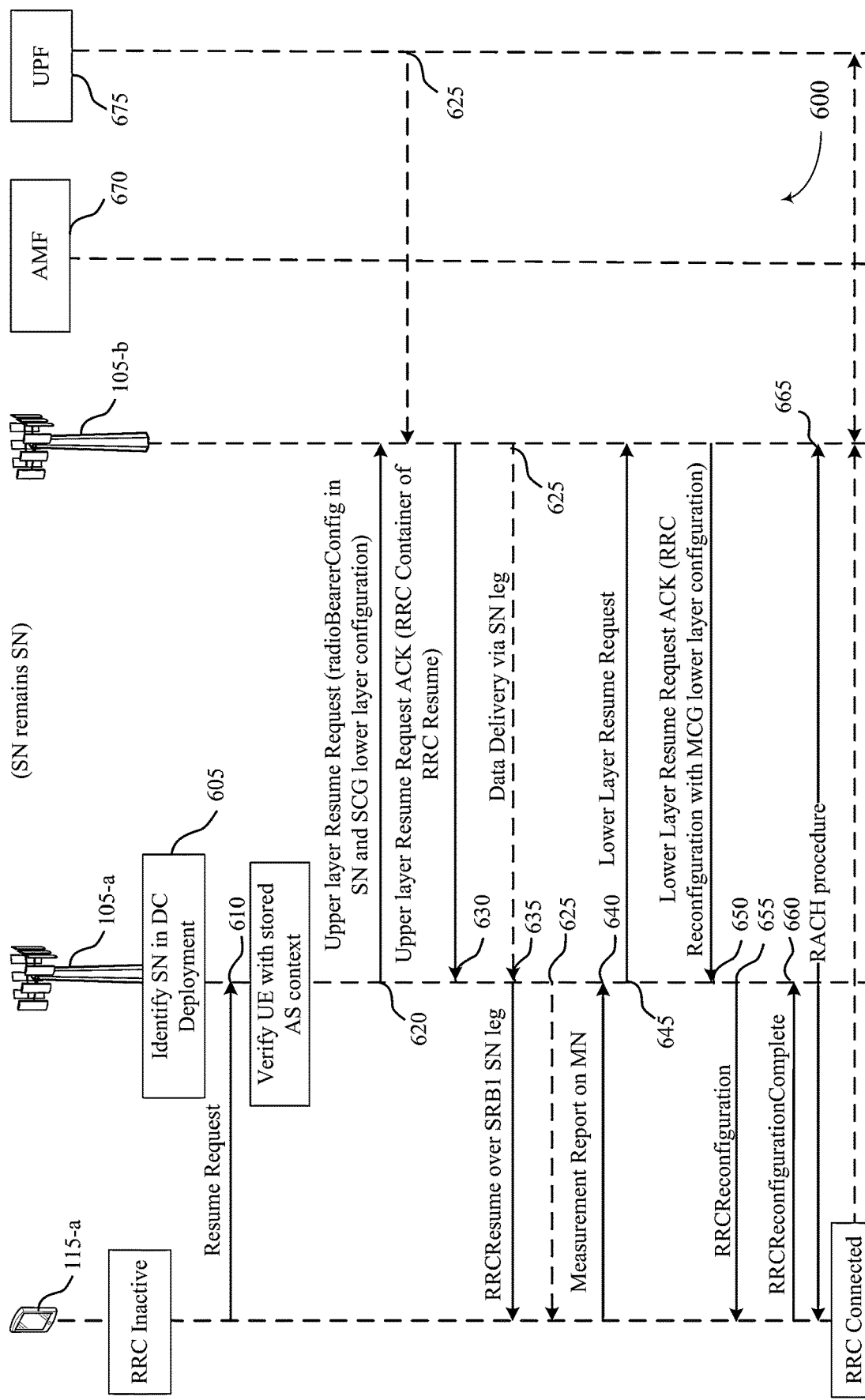
FIG. 6 illustrates an example of a process flow that supports resuming communication with a secondary node in dual connectivity in accordance with aspects of the present disclosure.

FIG. 6 illustrates an example of a process flow 600 that supports resuming communication with a secondary node in dual connectivity in accordance with aspects of the present disclosure. In some examples, process flow 600 may implement aspects of wireless communications systems 100 and 200. Process flow 600 may include UE 115-*a*, a first base station 105-*a* (e.g., an SN in a DC deployment with UE 115-*a*), and a second base station 105-*b* (e.g., an MN in the DC deployment with UE 115-*a*), which may be examples of UEs 115-*a* and base stations 105 as described herein with reference to FIGS. 1 and 2.

Process flow 600 may depict a scenario in which the SN (base station 105-*a*) remains the SN after resuming communications with UE 115-*a*. In the following description of the process flow 600, the operations between UE 115-*a*, base station 105-*a*, and base station 105-*b* may be performed in different orders or at different times. Some operations may also be left out of the process flow 600, or other operations may be added to the process flow 600. It is to be understood that while UE 115-*a* is shown performing a number of the operations of process flow 600, any wireless device may perform the operations shown.

In some cases, UE 115-*a* may initially be operating in an RRC inactive state, having previously established and suspended communications with base station 105-*a* and base station 105-*b* in a DC deployment. At 605, base station 105-*a* may identify that base station 105-*a* is an SN for the UE 115-*a* operating in a DC deployment, where the UE 115-*a* is operating in an RRC inactive state. In some cases, the base station 105-*a* may identify that it is the SN for the UE 115-*a* based on configuration information stored at base station 105-*a*, for example.

At 610, base station 105-*a* may receive, from UE 115-*a*, a request to resume communications with base station 105-*a* and base station 105-*b*. In some cases, the request to resume communications may be an RRC resume request, which may be received by base station 105-*a* via RRC signaling.

At 615, base station 105-*a* may verify UE 115-*a* using an access stratum context associated with UE 115-*a*. In some cases, the request to resume communications may include access stratum context information for UE 115-*a*, and base station 105-*a* may verify UE 115-*a* by identifying that base station 105-*a* has access to an access stratum context for UE 115-*a* stored at base station 105-*a*. That is, in some cases, the SN may verify UE 115-*a* using access stratum context stored at the SN.

In other cases, base station 105-*a* may verify UE 115-*a* by transmitting a verification request (e.g., including the access stratum context information received in the request to resume communications) to base station 105-*b*, which may verify UE 115-*a* using access stratum context for UE 115-*a* stored at base station 105-*b*. That is, in some cases, the SN may verify UE 115-*a* by requesting verification from the MN. In this case, base station 105-*b* may, after verifying UE 115-*a*, transmit a verification confirmation to base station 105-*a*. At 620, base station 105-*a* may transmit a request to resume an upper layer to base station 105-*b*. In some cases, the request to resume an upper layer may include a radio bearer configuration associated with base station 105-*a* and a lower layer configuration for an SCG associated with base station 105-*a*.

At 625, base station 105-*b* may forward, to base station 105-*a*, any pending downlink signals (e.g., control or data signals that may have been received by base station 105-*b* prior to UE 115-*a* requesting to resume communications). Base station 105-*a* may, in turn, forward the downlink signals to UE 115-*a*. Similarly, in some cases, pending uplink signals (e.g., control or data signals) may be forwarded from UE 115-*a* to base station 105-*a* via base station 105-*b*. In some cases, base station 105-*b* may forward the downlink signals to base station 105-*a* via a leg (e.g., a portion) of a split bearer associated with base station 105-a.

At 630, base station 105-*a* may receive an acknowledgement, from base station 105-*b*, of the request to resume upper layer communications. In some cases, the acknowledgement may include an RRC container of an RRC resume. In some cases, the RRC container may include an indication of the signaling radio bearer configuration associated with base station 105-*a*, an indication of a second signaling radio bearer configuration associated with base station 105-*b*, and the indication of the lower layer configuration associated with the SCG. In some cases, the RRC container may include an indication of a lower layer configuration associated with an MCG. In some cases, the RRC container may include a measurement configuration.

At 635, base station 105-*a* may transmit an indication to resume RRC communications to UE 115-*a*. In some cases, the indication to resume RRC communications is transmitted to UE 115-*a* via an SN leg (e.g., portion) of a signal radio bearer (e.g., SRB1).

In some cases, the indication to resume RRC communications may include an indication of a suspension of a lower layer or a measurement configuration associated with base station 105-*b* or with a RAN associated with base station 105-*b*. In some cases, base station 105-*a* may configure the measurement configuration associated with base station 105-*b*.

At 640, base station 105-*a* may, optionally, receive a measurement report from UE 115-*a*. In some cases, the measurement report may correspond to the measurement configuration transmitted to UE 115-*a* at 635 in the indication to resume RRC communications. In some cases, the measurement report may be associated with the MN; e.g., with base station 105-*b*. That is, the measurement report may include measurements of the signal quality for a master cell group of the MN. In some cases, the measurement report may be received via a signaling radio bearer, such as SRB1 or SRB3.

In some cases, if the measurement report is received on a new RAN, an MN handover may be initiated by either base station 105-*a* or base station 105-*b*. For example, if a measurement report for a new RAN is received by base station 105-*a* via SRB3, base station 105-*a* may initiate an inter-MN handover procedure (e.g., a handover from base station 105-*b* to another base station, which becomes the new MN), without changing the SN. In some cases, base station 105-*a* may initiate the inter-MN handover procedure by transmitting an indication of a handover required (not shown) to base station 105-*b*. In some cases, base station 105-*a* may forward the measurement report to base station 105-*b*.

For example, if a measurement report for a new RAN is received by base station 105-*b* via an SN leg of SRB1, base station 105-*b* may initiate an inter-MN handover procedure (e.g., a handover from base station 105-*b* to another base station, which becomes the new MN), without changing the SN. In either case, base station 105-*a* remains the SN after resuming communications with UE 115-*a*, and UE 115-*a* resumes communications in a DC deployment with base station 105-*a* and a third base station that is the new MN (e.g., after the handover procedure).

In some cases, if no measurement report is received, base station 105-*a* may initiate a handover procedure by, for example, transmitting an indication of a handover required (not shown) to base station 105-*b*. In this case, base station 105-*b* may respond by transmitting a handover request to base station 105-*a*. Base station 105-*a* may transmit an acknowledgement of the handover request to base station 105-*b*, and base station 105-*b* may be released from the DC deployment. In this case, base station 105-*a* may become the new MN when UE 115-*a* resumes communications with base station 105-*a*, and the DC deployment may change to a single-connectivity deployment; e.g., UE 115-*a* may communicate with a single base station 105-*a*.

At 645, base station 105-*a* may transmit, to base station 105-*b*, a request to resume lower layer communications. In response to receiving the request, in some cases, base station 105-*b* may resume lower layer communications using the measurement report received by base station 105-*a*. In some cases, base station 105-*b* may resume lower layer communications blindly; e.g., without using a measurement report. In some cases, resuming lower layer communications includes resuming communications with UPF 675, which may be responsible for functions such as packet routing and forwarding and connection with a data network, for example.

At 650, base station 105-*a* may receive, from base station 105-*b*, an acknowledgement of the request to resume lower layer communications. In some cases, the acknowledgement may include a configuration of a lower layer. At 655, base station 105-*a* may transmit an RRC reconfiguration to UE 115-*a*. The RRC reconfiguration may include, for example, configuration information related to re-establishing communications between UE 115-*a* and base station 105-*a*, such as configuration information for establishing, modifying, or releasing radio bearers, performing a handover, configuring measurements, configuring cells, or other types of configuration information.

At 660, base station 105-*a* may receive an indication of an RRC reconfiguration complete from UE 115-*a*. The indication of the RRC reconfiguration complete may indicate, for example, that the UE 115-*a* has reconfigured (for example) radio bearers, cells, etc. based on the RRC configuration received from base station 105-*a*. In some cases, the indication of the RRC reconfiguration indicates that the UE 115-*a* has transitioned (or will transition) to the RRC connected state (e.g., without entering the RRC idle state).

At 665, UE 115-*a* may perform a random access (RACH) procedure to synchronize with base station 105-*b* or, if an inter-MN handover has occurred, with a third base station serving as the new MN. At or after 665, base station 105-*a* may resume communications with UE 115-*a* in the RRC connected state. In some cases, a PDU session path update procedure may be performed.

Figure 7:
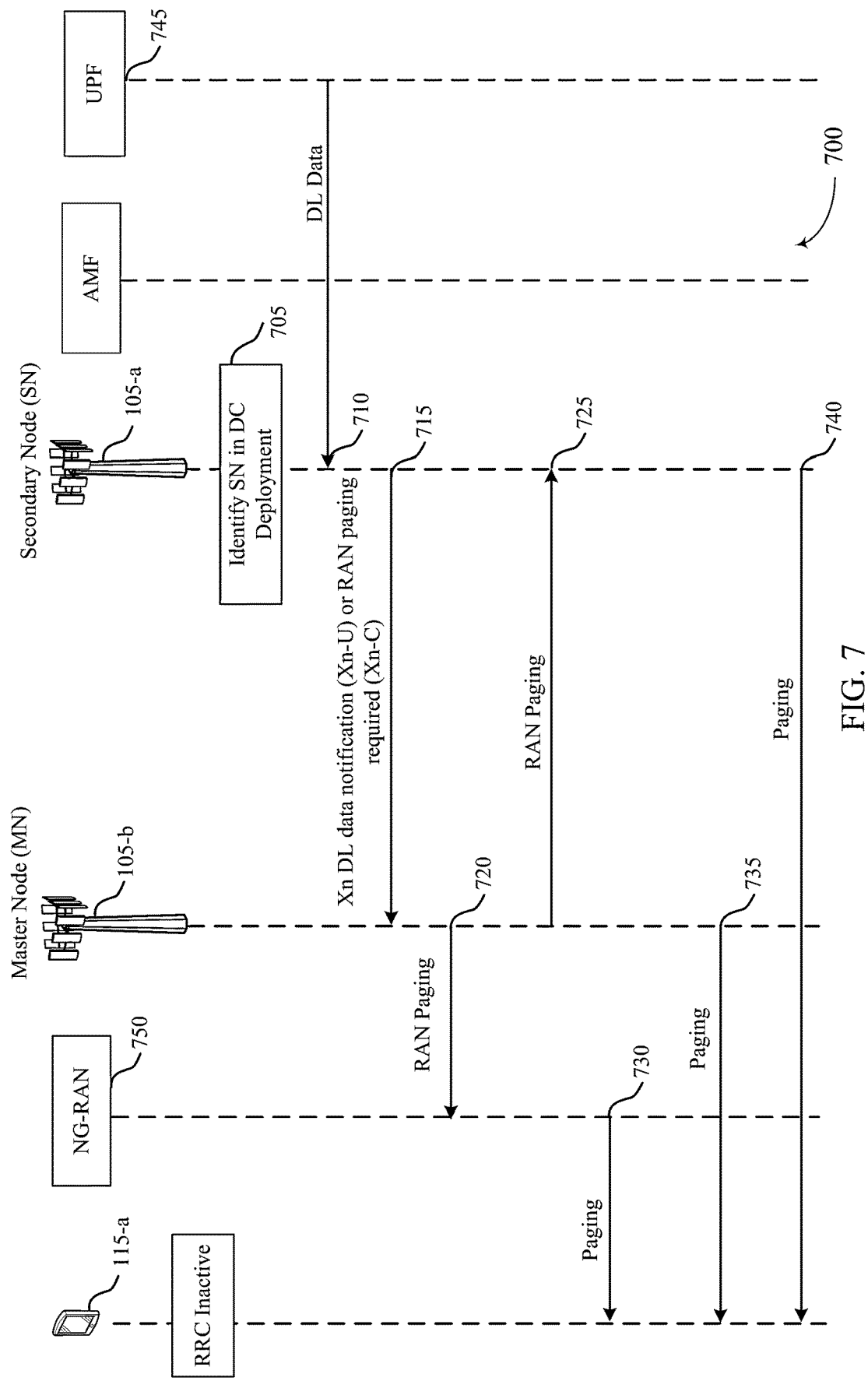
FIG. 7 illustrates an example of a process flow that supports resuming communication with a secondary node in dual connectivity in accordance with aspects of the present disclosure.

FIG. 7 illustrates an example of a process flow 700 that supports resuming communication with a secondary node in dual connectivity in accordance with aspects of the present disclosure. In some examples, process flow 700 may implement aspects of wireless communications systems 100 and 200. Process flow 700 may include UE 115-*a*, a first base station 105-*a* (e.g., an SN in a DC deployment with UE 115-*a*), and a second base station 105-*b* (e.g., an MN in the DC deployment with UE 115-*a*), which may be examples of UEs 115-*a* and base stations 105 as described herein with reference to FIGS. 1 and 2.

In some dual-connectivity deployments, such as in NG-EN DC and NE-DC, the MN and SN may be associated with different RATs to support release by one RAT (e.g., NR) and resume in another RAT (e.g., LTE). In some cases, a RAN area may include NR and LTE RATS, and an inter-RAT RAN paging procedure may be supported by wireless communications systems 100 and 200 to support NR-triggered paging towards LTE, and LTE-triggered paging towards NR.

In some cases, for downlink traffic to an SN-terminated radio bearer, RAN paging may be initiated by the MN in response to receiving a RAN paging request from the SN that may include a downlink data notification. Process flow 700 may depict a scenario in which inter-RAN paging is indirectly initiated by base station 105-*a* (SN) by transmitting a RAN paging request to base station 105-*b* (MN) while UE 115-*a* is in an RRC inactive state.

In the following description of the process flow 700, the operations between UE 115-*a*, base station 105-*a*, and base station 105-*b* may be performed in different orders or at different times. Some operations may also be left out of the process flow 700, or other operations may be added to the process flow 700. It is to be understood that while UE **115-*a* is shown performing a number of the operations of process flow 700, any wireless device may perform the operations shown. In some cases, UE 115-*a* may initially be operating in an RRC inactive state, having previously established and suspended communications with base station 105-*a* and base station 105-*b*** in a DC deployment.

At 705, base station **105-*a* may identify that base station 105-*a* is an SN for the UE 115-*a* operating in a DC deployment, where the UE 115-*a* is operating in an RRC inactive state. In some cases, the base station 105-*a* may identify that it is the SN for the UE 115-*a* based on configuration information stored at base station 105-*a*, for example. At 710, base station 105-*a* may receive, from a UPF 745, an indication of downlink data for the UE 115-*a***.

At 715, base station **105-*a* may initiate a paging operation for UE 115-*a* by transmitting a RAN paging request to base station 105-*b*. In some cases, base station 105-*a* may transmit the RAN paging request to base station 105-*b*** using an Xn interface, which may be an Xn backhaul network interface between NR base stations and LTE base stations. In some cases, the RAN paging request may be an Xn-C message, e.g., an activity notification or an encapsulated downlink user plane PDCP packet.

In some cases, the RAN paging request may be an Xn-U message, such as a downlink data notification. In this case, for a downlink user plane PDCP SDU, the PDCP SDU may be transmitted to UE **115-*a* via an existing SN-terminated split bearer MN leg. For a downlink user plane PDCP PDU, base station 105-*a*** may use data forwarding tunneling information allocated by the SN.

At 720, base station **105-*b* may transmit an indication of RAN paging to a RAN 750, such as a next-generation RAN (NG-RAN). At 725, base station 105-*a* may receive the indication of RAN paging from base station 105-*b*. At 730, RAN 750 may page UE 115-*a* based at least in part on the indication of RAN paging. At 735, base station 105-*b* may page UE 115-*a* based at least in part on the RAN paging request. At 740, base station 105-*a* may page UE 115-*a*** based at least in part on the indication of RAN paging.

Figure 8:
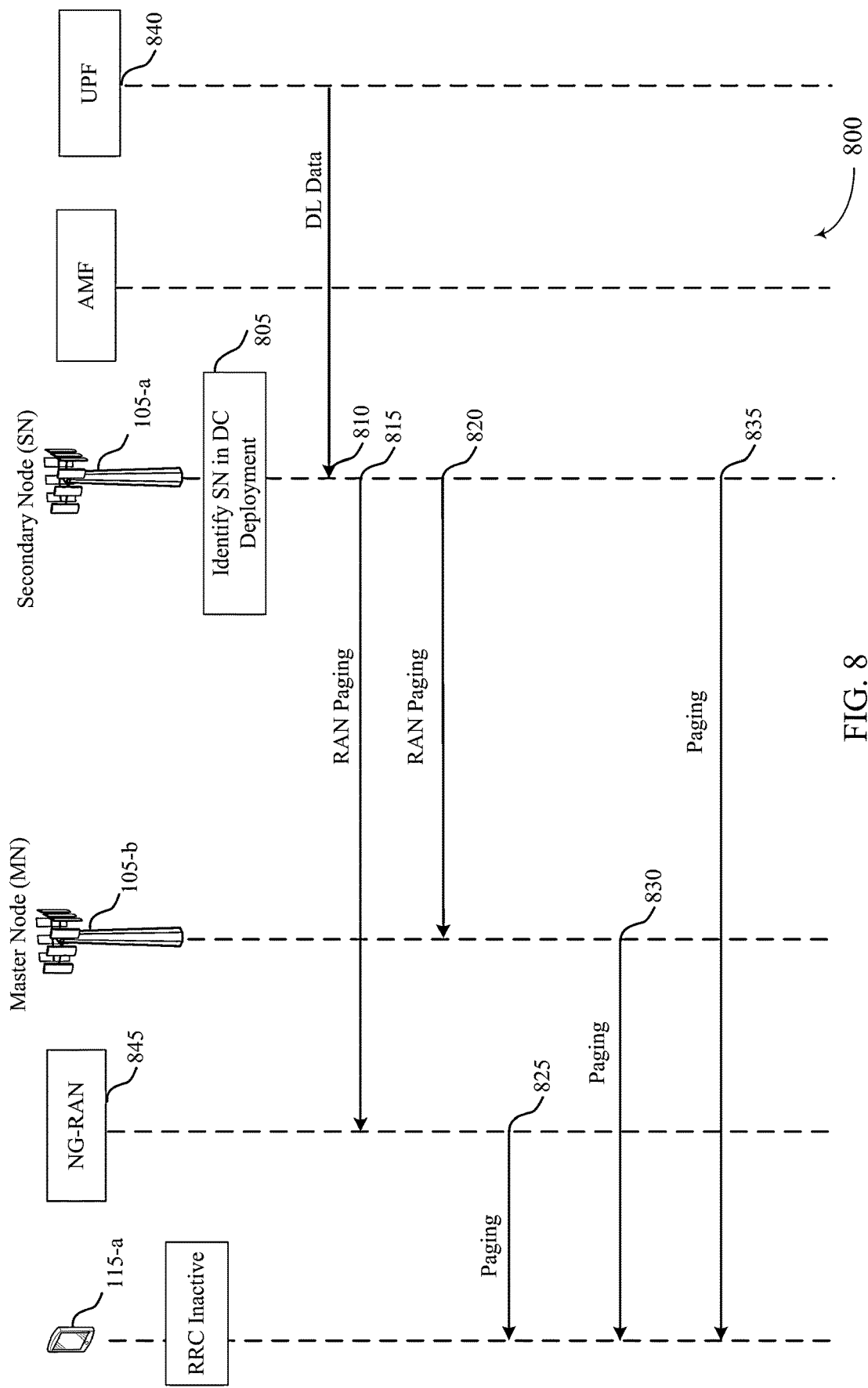
FIG. 8 illustrates an example of a process flow that supports resuming communication with a secondary node in dual connectivity in accordance with aspects of the present disclosure.

FIG. 8 illustrates an example of a process flow 800 that supports resuming communication with a secondary node in dual connectivity in accordance with aspects of the present disclosure. In some examples, process flow 800 may implement aspects of wireless communications systems 100 and 200. Process flow 800 may include UE **115-*a*, a first base station 105-*a* (e.g., an SN in a DC deployment with UE 115-*a*), and a second base station 105-*b* (e.g., an MN in the DC deployment with UE 115-*a*), which may be examples of UEs 115-*a* and base stations 105 as described herein with reference to FIGS. 1 and 2**.

Process flow 800 may depict a scenario in which inter-RAN paging is initiated directly by base station **105-*a* (SN) in response to receiving an indication of downlink data for UE 115-*a*. In the following description of the process flow 800, the operations between UE 115-*a*, base station 105-*a*, and base station 105-*b* may be performed in different orders or at different times. Some operations may also be left out of the process flow 800, or other operations may be added to the process flow 800. It is to be understood that while UE 115-*a* is shown performing a number of the operations of process flow 800**, any wireless device may perform the operations shown.

In some cases, UE **115-*a* may initially be operating in an RRC inactive state, having previously established communications with base station 105-*a* and base station 105-*b* in a DC deployment. At 805, base station 105-*a* may identify that base station 105-*a* is an SN for the UE 115-*a* operating in a DC deployment, where the UE 115-*a* is operating in an RRC inactive state. In some cases, the base station 105-*a* may identify that it is the SN for the UE 115-*a* based on configuration information stored at base station 105-*a***, for example.

At 810, base station **105-*a* may receive, from a UPF 840, an indication of downlink data for the UE 115-*a*. At 815 and 820, base station 105-*a* may initiate a paging operation for UE 115-*a* by transmitting an indication of RAN paging to base station 105-*b* and RAN 845. In some cases, base station 105-*a* may initiate the paging operation for UE 115-*a* using an AS context for UE 115-*a* stored at base station 105-*a*. At 825, RAN 845 may page UE 115-*a* based at least in part on the indication of RAN paging. At 830, base station 105-*b* may page UE 115-*a* based at least in part on the indication of RAN paging. At 835, base station 105-*a* may page UE 115-*a* based at least in part on the indication of downlink data for UE 115-*a***.

Figure 9:
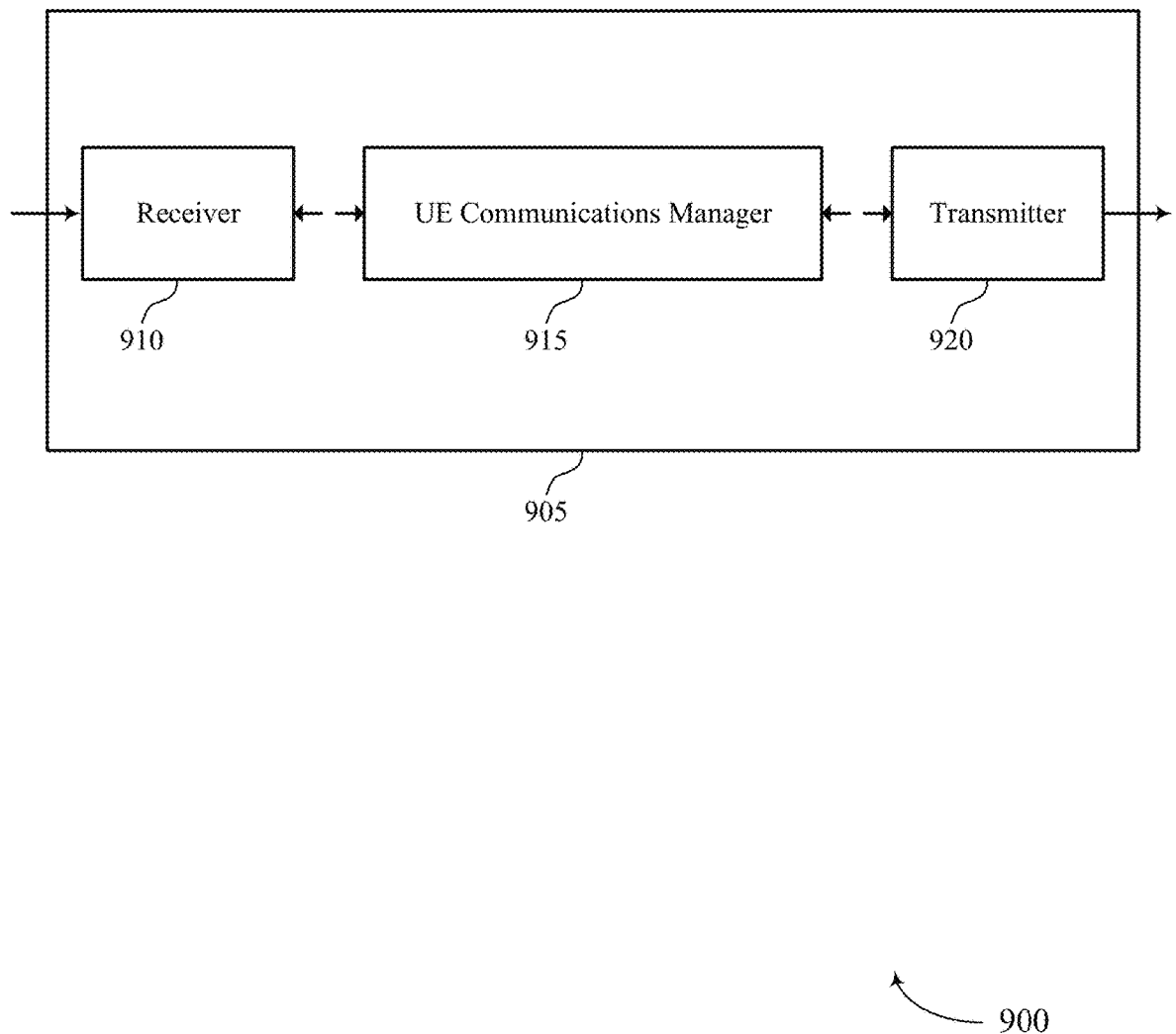
FIGS. 9 and 10 show block diagrams of devices that support resuming communication with a secondary node in dual connectivity in accordance with aspects of the present disclosure.

FIG. 9 shows a block diagram 900 of a device 905 that supports resuming communication with a secondary node in dual connectivity in accordance with aspects of the present disclosure. The device 905 may be an example of aspects of a UE 115 as described herein. The device 905 may include a receiver 910, a UE communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to resuming communication with a secondary node in dual connectivity, etc.). Information may be passed on to other components of the device 905. The receiver 910 may be an example of aspects of the transceiver 1220 described with reference to FIG. 12. The receiver 910 may utilize a single antenna or a set of antennas.

The UE communications manager 915 may identify that the UE is in an RRC inactive state and is to resume communications in a DC deployment. UE communications manager 915 may transmit, to a first base station that is an SN in the DC deployment, a request to resume communications with the first base station and a second base station that is an MN in the dual connectivity deployment. UE communications manager 915 may receive, from the first base station, an indication of an RRC configuration, and transition directly from the RRC inactive state to an RRC connected state based at least in part on the RRC configuration. UE communications manager 915 may resume communications with at least the first base station in the RRC connected state. The UE communications manager 915 may be an example of aspects of the UE communications manager 1210 described herein.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
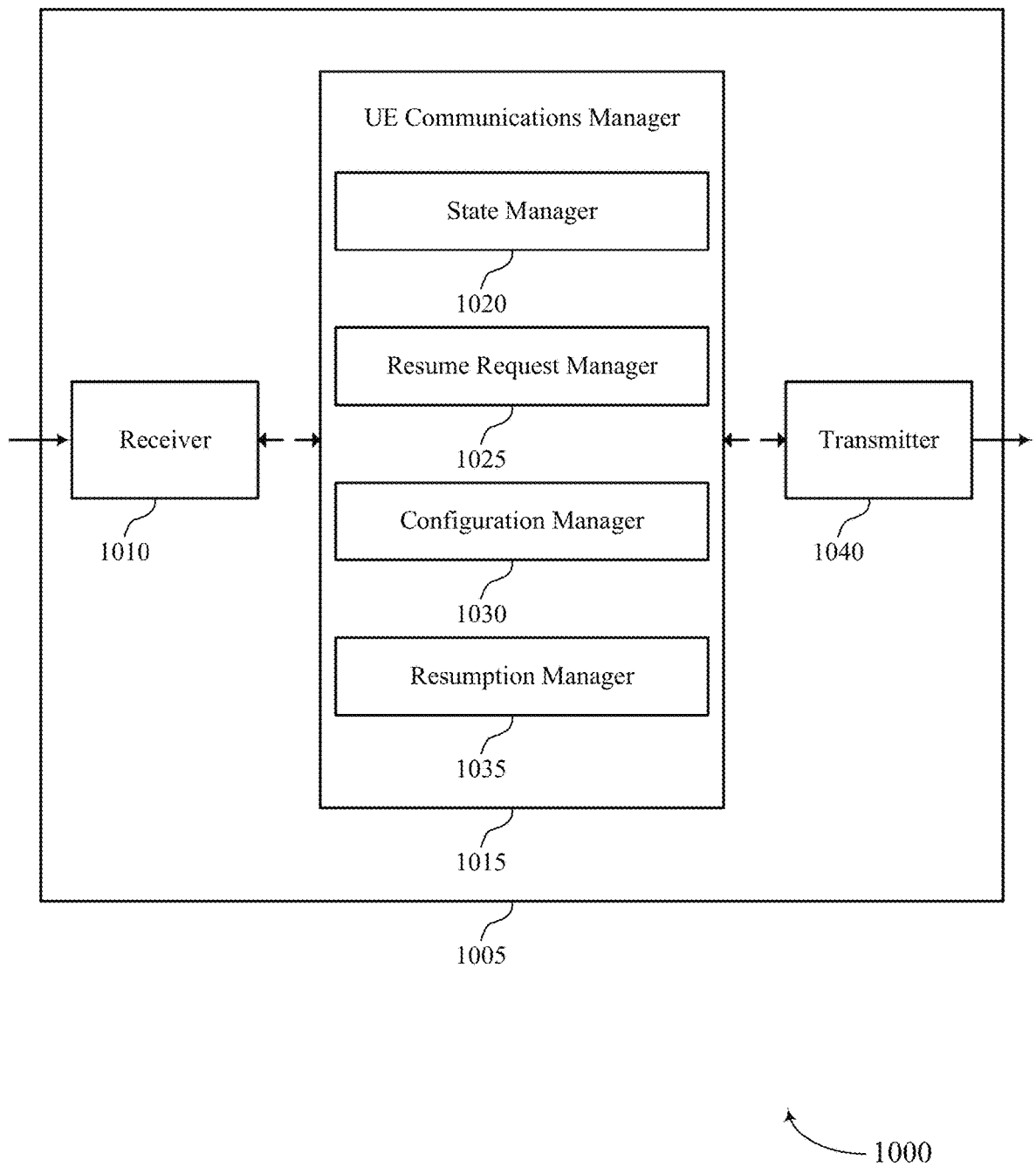

FIG. 10 shows a block diagram 1000 of a device 1005 that supports resuming communication with a secondary node in dual connectivity in accordance with aspects of the present disclosure. The device 1005 may be an example of aspects of a device 905, or a UE 115 as described herein. The device 1005 may include a receiver 1010, a UE communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to resuming communication with a secondary node in dual connectivity, etc.). Information may be passed on to other components of the device 1005. The receiver 1010 may be an example of aspects of the transceiver 1220 described with reference to FIG. 12. The receiver 1010 may utilize a single antenna or a set of antennas.

The UE communications manager 1015 may be an example of aspects of the UE communications manager 915 as described herein. The UE communications manager 1015 may include a state manager 1020, a resume request manager 1025, a configuration manager 1030, and a resumption manager 1035. The UE communications manager 1015 may be an example of aspects of the UE communications manager 1210 described herein.

The state manager 1020 may identify that the UE is in an RRC inactive state and is to resume communications in a dual connectivity deployment. The state manager 1020 may transition directly from the RRC inactive state to an RRC connected state based on an RRC configuration. The resume request manager 1025 may transmit, to a first base station that is a secondary node in the dual connectivity deployment, a request to resume communications with the first base station and a second base station that is a master node in the dual connectivity deployment.

The configuration manager 1030 may receive, from the first base station, an indication of the RRC configuration. The resumption manager 1035 may resume communications with at least the first base station in the RRC connected state. The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
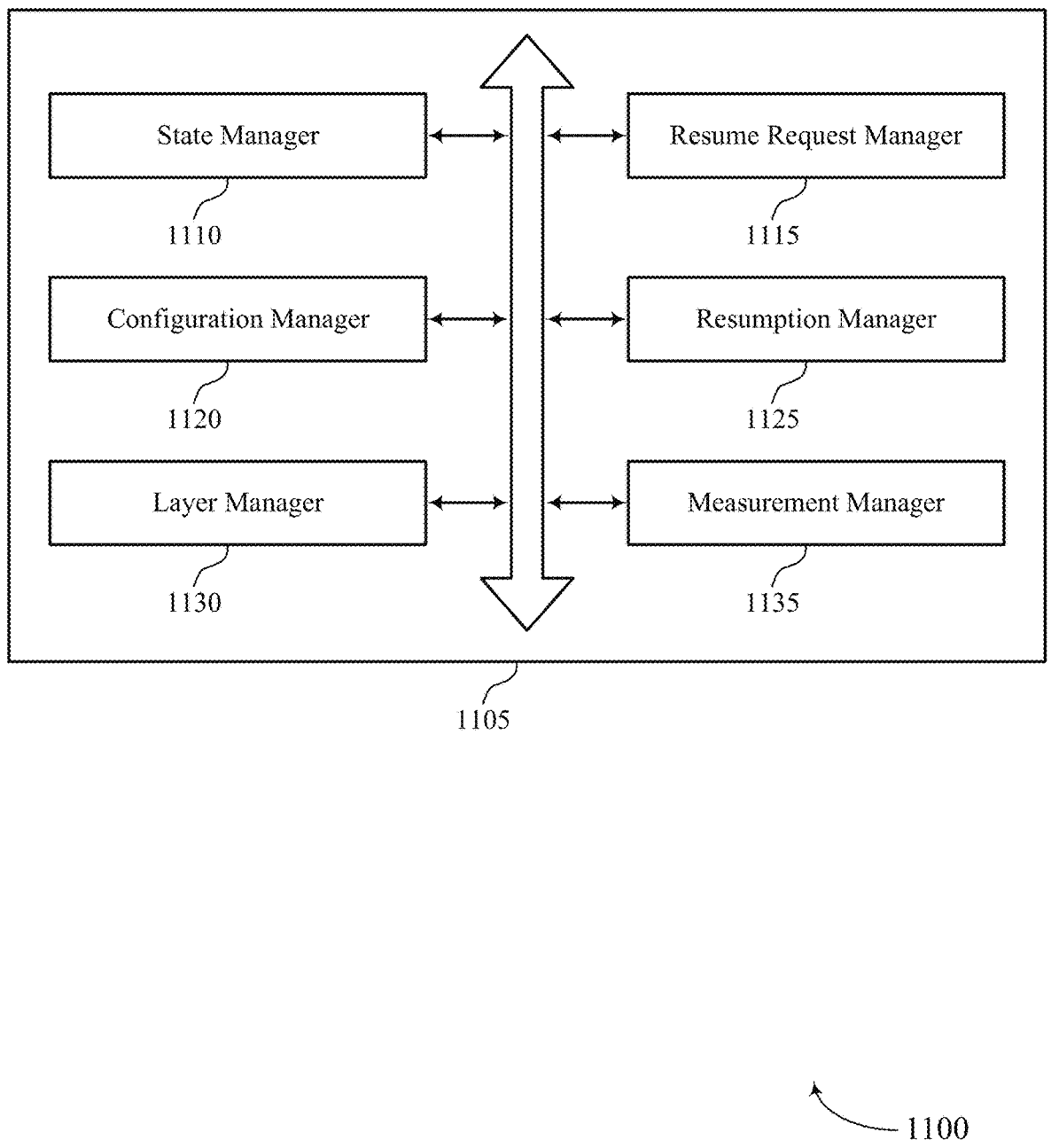
FIG. 11 shows a block diagram of a base station communications manager that supports resuming communication with a secondary node in dual connectivity in accordance with aspects of the present disclosure.

FIG. 11 shows a block diagram 1100 of a UE communications manager 1105 that supports resuming communication with a secondary node in dual connectivity in accordance with aspects of the present disclosure. The UE communications manager 1105 may be an example of aspects of a UE communications manager 915, a UE communications manager 1015, or a UE communications manager 1210 described herein. The UE communications manager 1105 may include a state manager 1110, a resume request manager 1115, a configuration manager 1120, a resumption manager 1125, a layer manager 1130, and a measurement manager 1135. Each of these modules may communicate, directly or indirectly, with one another (e.g., via one or more buses).

The state manager 1110 may identify that the UE is in an RRC inactive state and is to resume communications in a dual connectivity deployment. In some examples, the state manager 1110 may transition directly from the RRC inactive state to an RRC connected state based on an RRC configuration. In some examples, transitioning directly from the RRC inactive state to the RRC connected state includes transitioning from the RRC inactive state to the RRC connected state without entering an RRC idle state.

The resume request manager 1115 may transmit, to a first base station that is a secondary node in the dual connectivity deployment, a request to resume communications with the first base station and a second base station that is a master node in the dual connectivity deployment. The configuration manager 1120 may receive, from the first base station, an indication of the RRC configuration.

The resumption manager 1125 may resume communications with at least the first base station in the RRC connected state. In some examples, resuming communications with at least the first base station includes resuming communications with the first base station as the master node. In some examples, resuming communications with at least the first base station includes resuming communications with a third base station as a new secondary node. In some examples, resuming communications with at least the first base station includes resuming communications with the first base station as the secondary node.

In some examples, the resumption manager 1125 may receive, from the first base station, an indication to resume RRC communications via a portion of a signaling radio bearer associated with the first base station. The layer manager 1130 may receive, from the first base station, an indication of a suspension of a lower layer of a secondary cell group associated with the second base station.

The measurement manager 1135 may receive, from the first base station, an indication of a measurement configuration associated with the second base station. In some examples, the measurement manager 1135 may transmit, to the first base station, a measurement report associated with the second base station, where the measurement report is based on the indication of the measurement configuration associated with the second base station. In some examples, the measurement manager 1135 may perform a measurement based on a stored measurement configuration, where the measurement is performed before entering the RRC inactive state.

Figure 12:
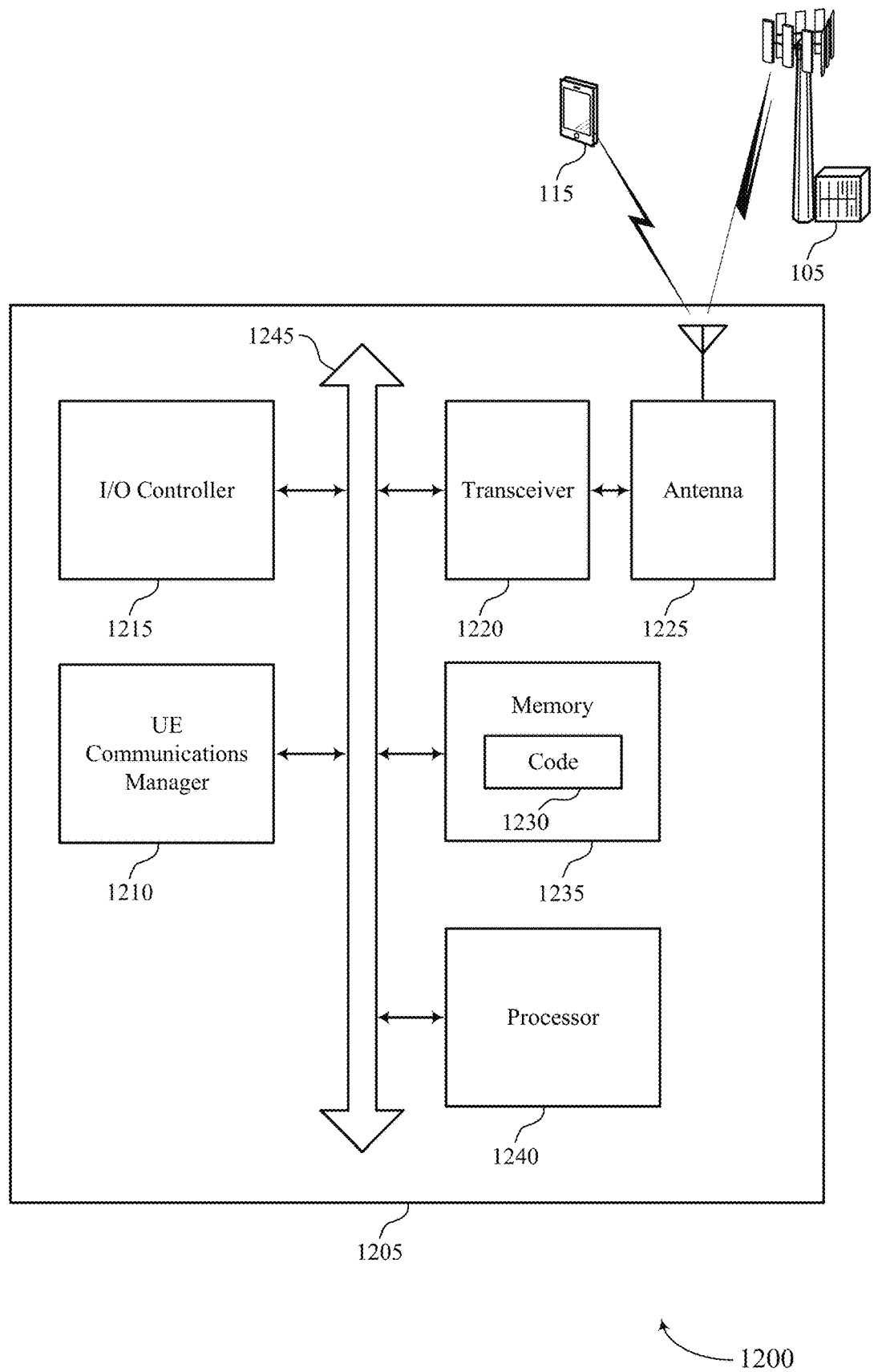
FIG. 12 shows a diagram of a system including a device that supports resuming communication with a secondary node in dual connectivity in accordance with aspects of the present disclosure.

FIG. 12 shows a diagram of a system 1200 including a device 1205 that supports resuming communication with a secondary node in dual connectivity in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The UE communications manager 1210 may identify that the UE is in an RRC inactive state and is to resume communications in a DC deployment. UE communications manager 1210 may transmit, to a first base station that is an SN in the DC deployment, a request to resume communications with the first base station and a second base station that is an MN in the dual connectivity deployment. UE communications manager 1210 may receive, from the first base station, an indication of an RRC configuration, and transition directly from the RRC inactive state to an RRC connected state based at least in part on the RRC configuration. UE communications manager 1210 may resume communications with at least the first base station in the RRC connected state.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting resuming communication with a secondary node in dual connectivity).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
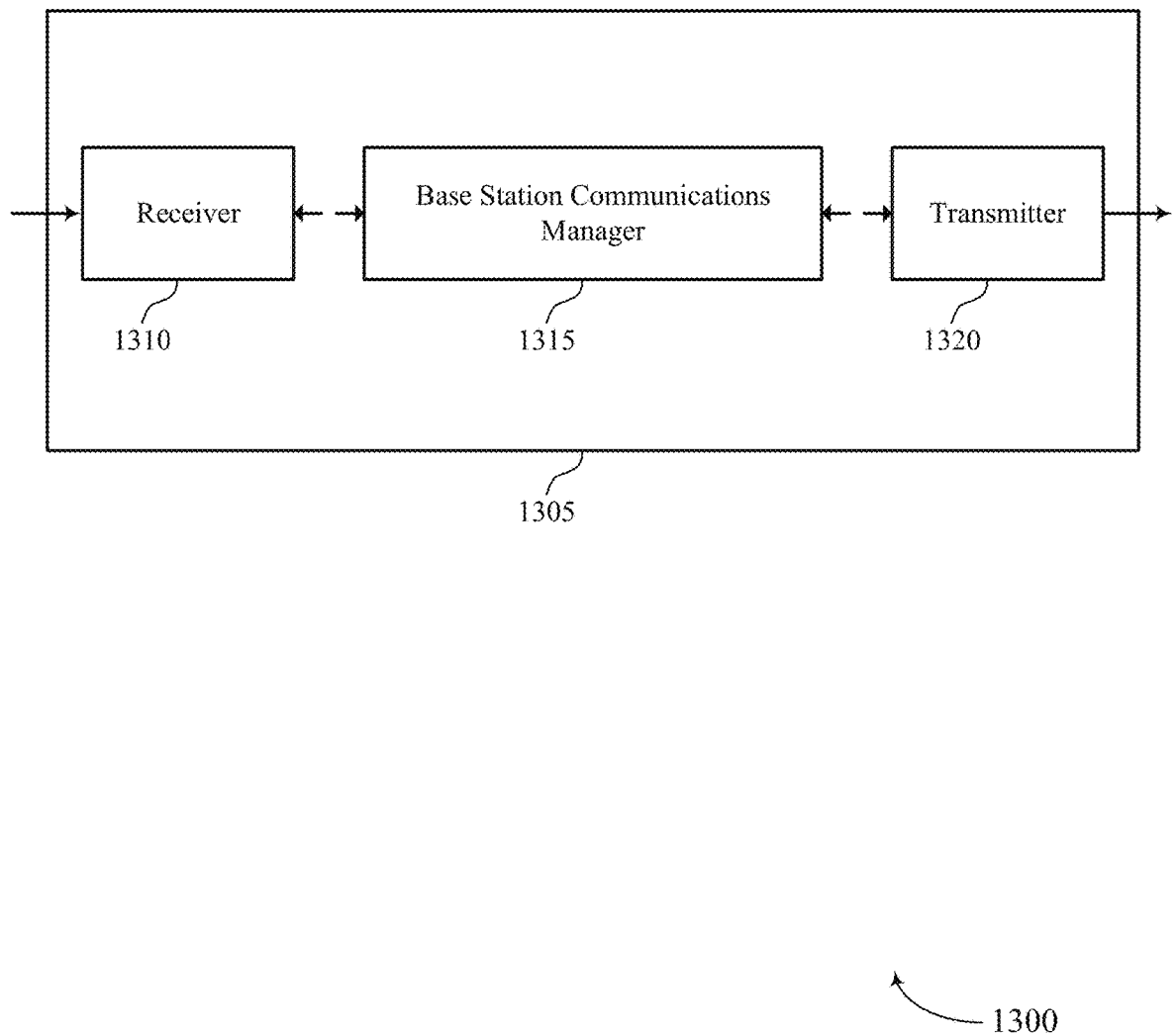
FIGS. 13 and 14 show block diagrams of devices that support resuming communication with a secondary node in dual connectivity in accordance with aspects of the present disclosure.

FIG. 13 shows a block diagram 1300 of a device 1305 that supports resuming communication with a secondary node in dual connectivity in accordance with aspects of the present disclosure. The device 1305 may be an example of aspects of a base station 105 as described herein. The device 1305 may include a receiver 1310, a base station communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to resuming communication with a secondary node in dual connectivity, etc.). Information may be passed on to other components of the device 1305. The receiver 1310 may be an example of aspects of the transceiver 1620 described with reference to FIG. 16. The receiver 1310 may utilize a single antenna or a set of antennas.

The base station communications manager 1315 may identify that a first base station is a secondary node for a UE operating in a dual connectivity deployment, where the UE is in an RRC inactive state. The base station communications manager 1315 may receive, from the UE, a request to resume communications with the first base station and a second base station that is a master node in the dual connectivity deployment. The base station communications manager 1315 may verify the UE using an access stratum context associated with the UE, and resume communications with the UE based on the request and the access stratum context. The base station communications manager 1315 may also identify that the first base station is a secondary node for a UE operating in a dual connectivity deployment, where the UE is in an RRC inactive state, and receive, from a user plane function (UPF), an indication of downlink data for the UE. The base station communications manager 1315 may initiate a paging operation for the UE. The base station communications manager 1315 may be an example of aspects of the base station communications manager 1610 described herein.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
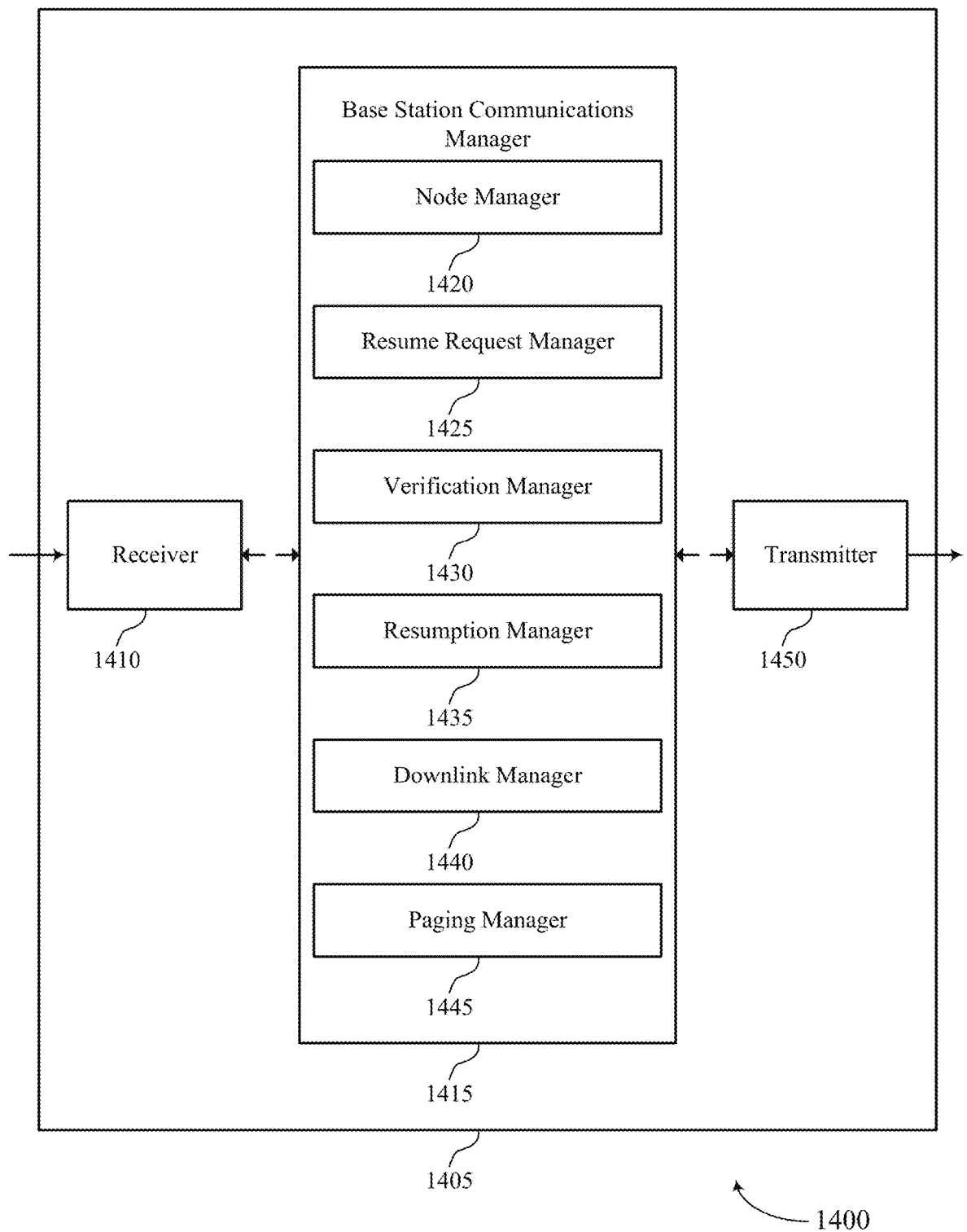

FIG. 14 shows a block diagram 1400 of a device 1405 that supports resuming communication with a secondary node in dual connectivity in accordance with aspects of the present disclosure. The device 1405 may be an example of aspects of a device 1305, or a base station 105 as described herein. The device 1405 may include a receiver 1410, a base station communications manager 1415, and a transmitter 1450. The device 1405 may also include a processor. Each of these components may be in communication with one another (e.g., via one or more buses).

The receiver 1410 may receive information such as packets, user data, or control information associated with various information channels (e.g., control channels, data channels, and information related to resuming communication with a secondary node in dual connectivity, etc.). Information may be passed on to other components of the device 1405. The receiver 1410 may be an example of aspects of the transceiver 1620 described with reference to FIG. 16. The receiver 1410 may utilize a single antenna or a set of antennas.

The base station communications manager 1415 may be an example of aspects of the base station communications manager 1315 as described herein. The base station communications manager 1415 may include a node manager 1420, a resume request manager 1425, a verification manager 1430, a resumption manager 1435, a downlink manager 1440, and a paging manager 1445. The base station communications manager 1415 may be an example of aspects of the base station communications manager 1610 described herein.

The node manager 1420 may identify that the first base station is a secondary node for a UE operating in a dual connectivity deployment, where the UE is in an RRC inactive state. The resume request manager 1425 may receive, from the UE, a request to resume communications with the first base station and a second base station that is a master node in the dual connectivity deployment.

The verification manager 1430 may verify the UE using an access stratum context associated with the UE. The resumption manager 1435 may resume communications with the UE based on the request and the access stratum context. The downlink manager 1440 may receive, from a user plane function (UPF), an indication of downlink data for the UE. The paging manager 1445 may initiate a paging operation for the UE.

The transmitter 1450 may transmit signals generated by other components of the device 1405. In some examples, the transmitter 1450 may be collocated with a receiver 1410 in a transceiver module. For example, the transmitter 1450 may be an example of aspects of the transceiver 1620 described with reference to FIG. 16. The transmitter 1450 may utilize a single antenna or a set of antennas.

Figure 15:
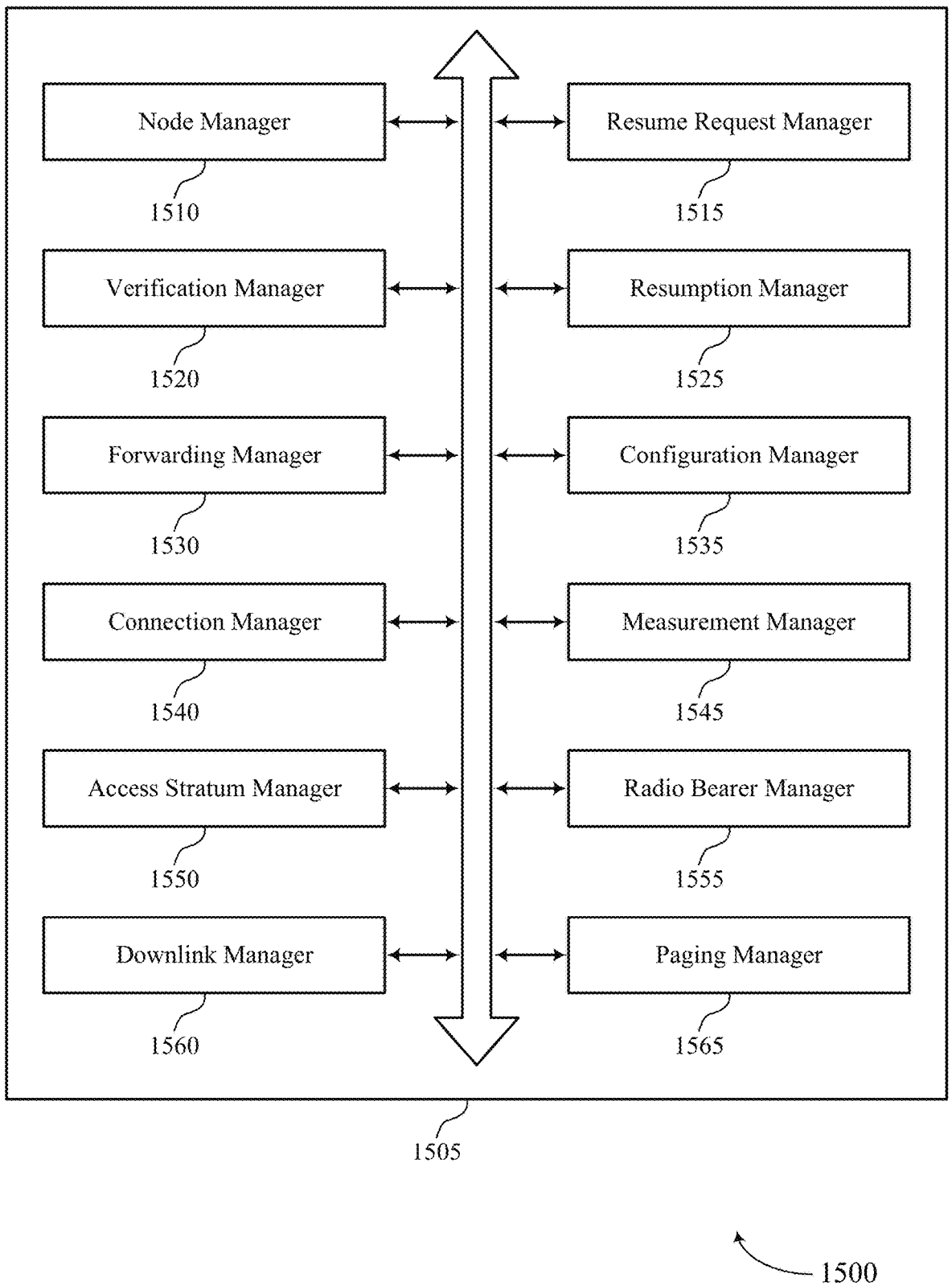
FIG. 15 shows a block diagram of a UE communications manager that supports resuming communication with a secondary node in dual connectivity in accordance with aspects of the present disclosure.

FIG. 15 shows a block diagram 1500 of a base station communications manager 1505 that supports resuming communication with a secondary node in dual connectivity in accordance with aspects of the present disclosure. The base station communications manager 1505 may be an example of aspects of a base station communications manager 1315, a base station communications manager 1415, or a base station communications manager 1610 described herein. The base station communications manager 1505 may include a node manager 1510, a resume request manager 1515, a verification manager 1520, a resumption manager 1525, a forwarding manager 1530, a configuration manager 1535, a connection manager 1540, a measurement manager 1545, an access stratum manager 1550, a radio bearer manager 1555, a downlink manager 1560, and a paging manager 1565. Each of these modules may communicate, directly or indirectly, with one another (e.g., via one or more buses).

The node manager 1510 may identify that the first base station is a secondary node for a UE operating in a dual connectivity deployment, where the UE is in an RRC inactive state. In some examples, the node manager 1510 may identify that the first base station is a secondary node for a UE operating in a dual connectivity deployment, where the UE is in an RRC inactive state. In some examples, the node manager 1510 may establish a third base station as a new secondary node. In some examples, the node manager 1510 may transmit, to the second base station, a request to release the second base station from the dual connectivity deployment with the UE. In some examples, the node manager 1510 may maintain the first base station as the secondary node in the dual connectivity deployment. In some cases, the first base station and the second base station operate on different carrier frequencies.

The resume request manager 1515 may receive, from the UE, a request to resume communications with the first base station and a second base station that is a master node in the dual connectivity deployment. In some examples, the resume request manager 1515 may transmit, to the second base station, a request to resume upper layer communications based on the request to resume communications from the UE. In some examples, the resume request manager 1515 may receive, from the second base station, an acknowledgement of the request to resume upper layer communications. In some examples, the resume request manager 1515 may transmit, to the UE, an indication to resume RRC communications. In some examples, the resume request manager 1515 may split a signaling radio bearer into a first portion associated with the first base station and a second portion associated with the second base station, where the indication to resume RRC communications is transmitted via the first portion of the signaling radio bearer.

In some examples, the resume request manager 1515 may transmit, to the second base station, a request to resume lower layer communications. In some examples, the resume request manager 1515 may receive, from the second base station, an acknowledgement of the request to resume lower layer communications. In some cases, the acknowledgement includes an indication of a suspension of a lower layer. In some cases, the indication to resume RRC communications includes an indication of a suspension of a lower layer of a secondary cell group associated with the first base station based on the acknowledgement.

The verification manager 1520 may verify the UE using an access stratum context associated with the UE and stored at the first base station. The resumption manager 1525 may resume communications with the UE based on the request and the access stratum context. In some examples, the resumption manager 1525 may communicate with an access mobility function to transition the first base station from the secondary node to the master node. In some examples, the resumption manager 1525 may communicate with the UE as the master node. In some examples, the resumption manager 1525 may communicate with the UE as the secondary node. The downlink manager 1560 may receive, from a user plane function (UPF), an indication of downlink data for the UE. The paging manager 1565 may initiate a paging operation for the UE. In some examples, initiating the paging operation includes identifying an access context stored at the first base station for the UE.

In some examples, the paging manager 1565 may transmit a RAN paging request to a second base station that is a master node for the dual connectivity deployment, where the first base station is associated with a first RAT and the second base station is associated with a second RAT. In some examples, the paging manager 1565 may receive an indication of RAN paging from the second base station. In some examples, the paging manager 1565 may page the UE based on the indication of RAN paging. In some examples, the paging manager 1565 may transmit an indication of RAN paging to a first RAN and to a second base station that is a master node for the dual connectivity deployment. The forwarding manager 1530 may receive data forwarded from the second base station using a temporary data radio bearer or a split radio bearer.

The configuration manager 1535 may transmit, to the UE, an indication of an RRC configuration. In some examples, the configuration manager 1535 may transmit, to the second base station, an indication of a signaling radio bearer configuration associated with the first base station and an indication of a lower layer configuration associated with a secondary cell group. In some examples, the configuration manager 1535 may receive, from the second base station, an RRC container including the indication of the signaling radio bearer configuration associated with the first base station, an indication of a second signaling radio bearer configuration associated with the second base station, and the indication of the lower layer configuration associated with the secondary cell group. In some cases, the RRC container includes an indication of a lower layer configuration associated with a master cell group. In some cases, the RRC container includes a measurement configuration.

In some examples, the configuration manager 1535 may reconfigure, before receiving the request from the UE, a split bearer or a temporary data radio bearer for communication with the UE. The connection manager 1540 may receive, from the UE, an indication of an RRC connection with the first base station, where the first base station is connected as the new master node in the dual connectivity deployment. The measurement manager 1545 may identify a measurement configuration associated with the second base station or with a RAN, where the indication to resume RRC communications includes the measurement configuration.

In some examples, the measurement manager 1545 may receive, from the UE, a measurement report associated with the second base station, where the measurement report corresponds to the measurement configuration. In some examples, the measurement manager 1545 may receive a second measurement report on a first RAN from the UE before receiving the request to resume communications. In some examples, the measurement manager 1545 may identify, based on receiving the measurement report, that the measurement report is associated with a second RAN different than the first RAN, where transitioning from the secondary node to the master node and establishing a new secondary node are based on identifying that the measurement report is associated with the second RAN.

In some examples, the measurement manager 1545 may identify that a measurement report associated with the second base station has not been received from the UE. The access stratum manager 1550 may store, before receiving the request from the UE, the access stratum context for the UE at the first base station. In some cases, the access stratum context includes a radio bearer configuration, a resume identity, a RAN paging cycle, a RAN notification area associated with a first RAT and a second RAT, a periodic timer, an NCC and a corresponding S-kgNB, a measurement associated with the first base station, and a measurement associated with the second base station. The radio bearer manager 1555 may add one or more temporary data radio bearers to the first base station for forwarding data between the first base station and the second base station, where the one or more temporary data radio bearers correspond to one or more data radio bearers that are terminated at the second base station.

Figure 16:
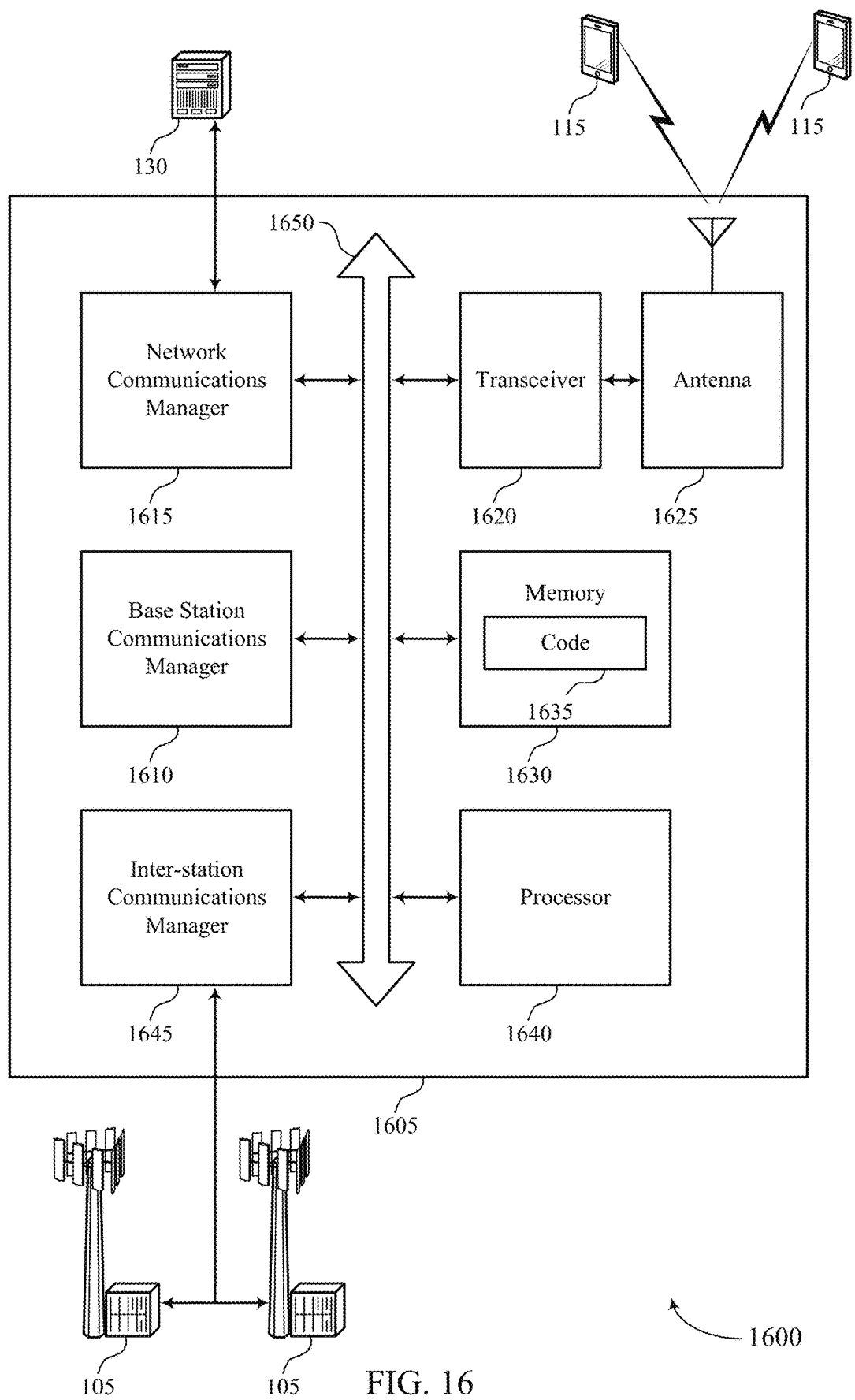
FIG. 16 shows a diagram of a system including a device that supports resuming communication with a secondary node in dual connectivity in accordance with aspects of the present disclosure.

FIG. 16 shows a diagram of a system 1600 including a device 1605 that supports resuming communication with a secondary node in dual connectivity in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a base station communications manager 1610, a network base station communications manager 1615, a transceiver 1620, an antenna 1625, memory 1630, a processor 1640, and an inter-station base station communications manager 1645. These components may be in electronic communication via one or more buses (e.g., bus 1650).

The base station communications manager 1610 may identify that the first base station is a secondary node for a UE operating in a dual connectivity deployment, where the UE is in an RRC inactive state. The base station communications manager 1610 may receive, from the UE, a request to resume communications with the first base station and a second base station that is a master node in the dual connectivity deployment. The base station communications manager 1610 may verify the UE using an access stratum context associated with the UE and stored at the first base station, and resume communications with the UE based on the request and the access stratum context. The base station communications manager 1610 may also receive, from a user plane function (UPF), an indication of downlink data for the UE, and initiate a paging operation for the UE.

The network base station communications manager 1615 may manage communications with the core network (e.g., via one or more wired backhaul links). For example, the network base station communications manager 1615 may manage the transfer of data communications for client devices, such as one or more UEs 115. The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions. The memory 1630 may include RAM, ROM, or a combination thereof The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting resuming communication with a secondary node in dual connectivity).

The inter-station base station communications manager 1645 may manage communications with other base station 105, and may include a controller or scheduler for controlling communications with UEs 115 in cooperation with other base stations 105. For example, the inter-station base station communications manager 1645 may coordinate scheduling for transmissions to UEs 115 for various interference mitigation techniques such as beamforming or joint transmission. In some examples, the inter-station base station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
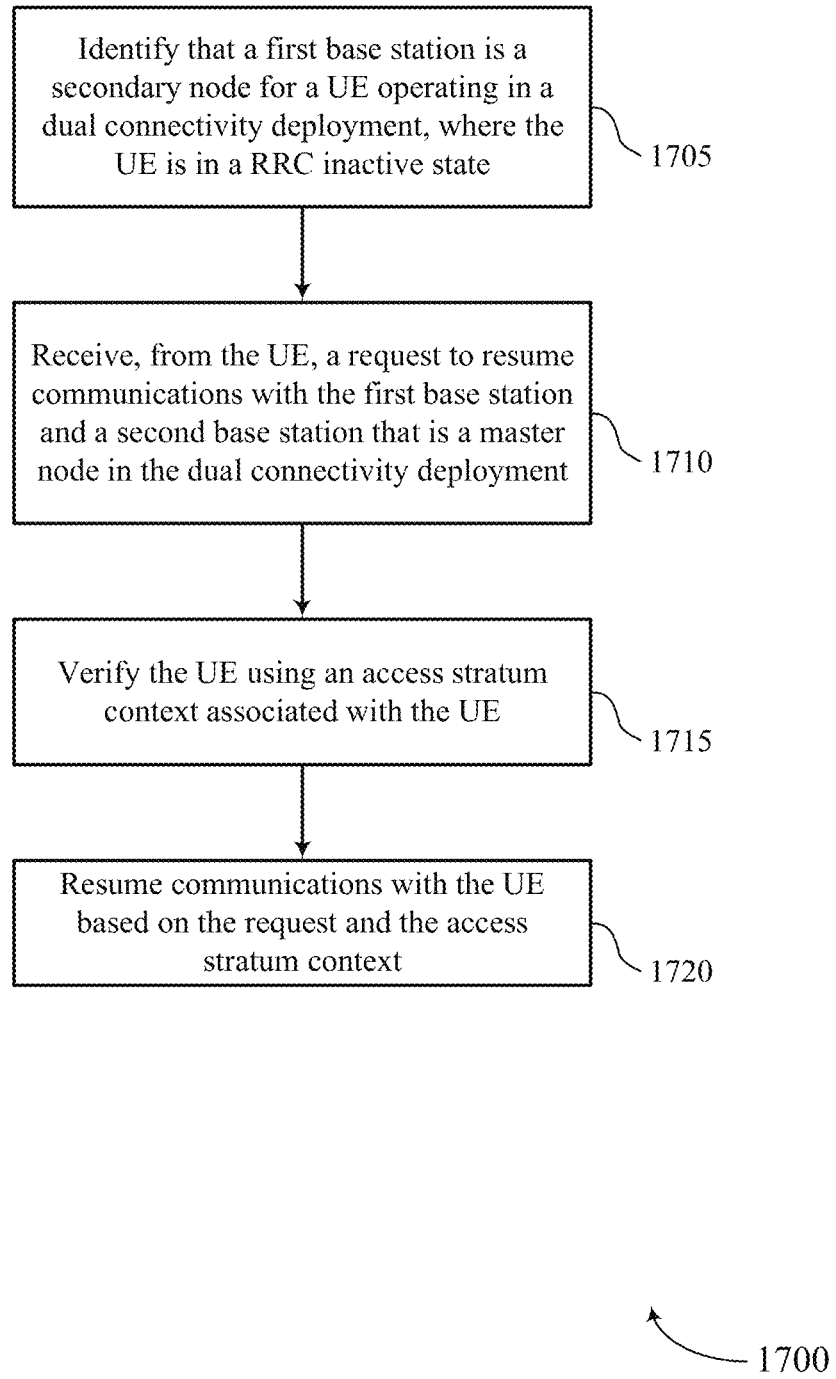
FIGS. 17 through 19 show flowcharts illustrating methods that support resuming communication with a secondary node in dual connectivity in accordance with aspects of the present disclosure.

FIG. 17 shows a flowchart illustrating a method 1700 that supports resuming communication with a secondary node in dual connectivity in accordance with aspects of the present disclosure. The operations of method 1700 may be implemented by a base station 105 or its components as described herein. For example, the operations of method 1700 may be performed by a base station communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 1705, the base station may identify that the first base station is a secondary node for a UE operating in a dual connectivity deployment, where the UE is in an RRC inactive state. The operations of 1705 may be performed according to the methods described herein. In some examples, aspects of the operations of 1705 may be performed by a node manager as described with reference to FIGS. 13 through 16.

At 1710, the base station may receive, from the UE, a request to resume communications with the first base station and a second base station that is a master node in the dual connectivity deployment. The operations of 1710 may be performed according to the methods described herein. In some examples, aspects of the operations of 1710 may be performed by a resume request manager as described with reference to FIGS. 13 through 16.

At 1715, the base station may verify the UE using an access stratum context associated with the UE and stored at the first base station. The operations of 1715 may be performed according to the methods described herein. In some examples, aspects of the operations of 1715 may be performed by a verification manager as described with reference to FIGS. 13 through 16.

At 1720, the base station may resume communications with the UE based on the request and the access stratum context. The operations of 1720 may be performed according to the methods described herein. In some examples, aspects of the operations of 1720 may be performed by a resumption manager as described with reference to FIGS. 13 through 16.

Figure 18:
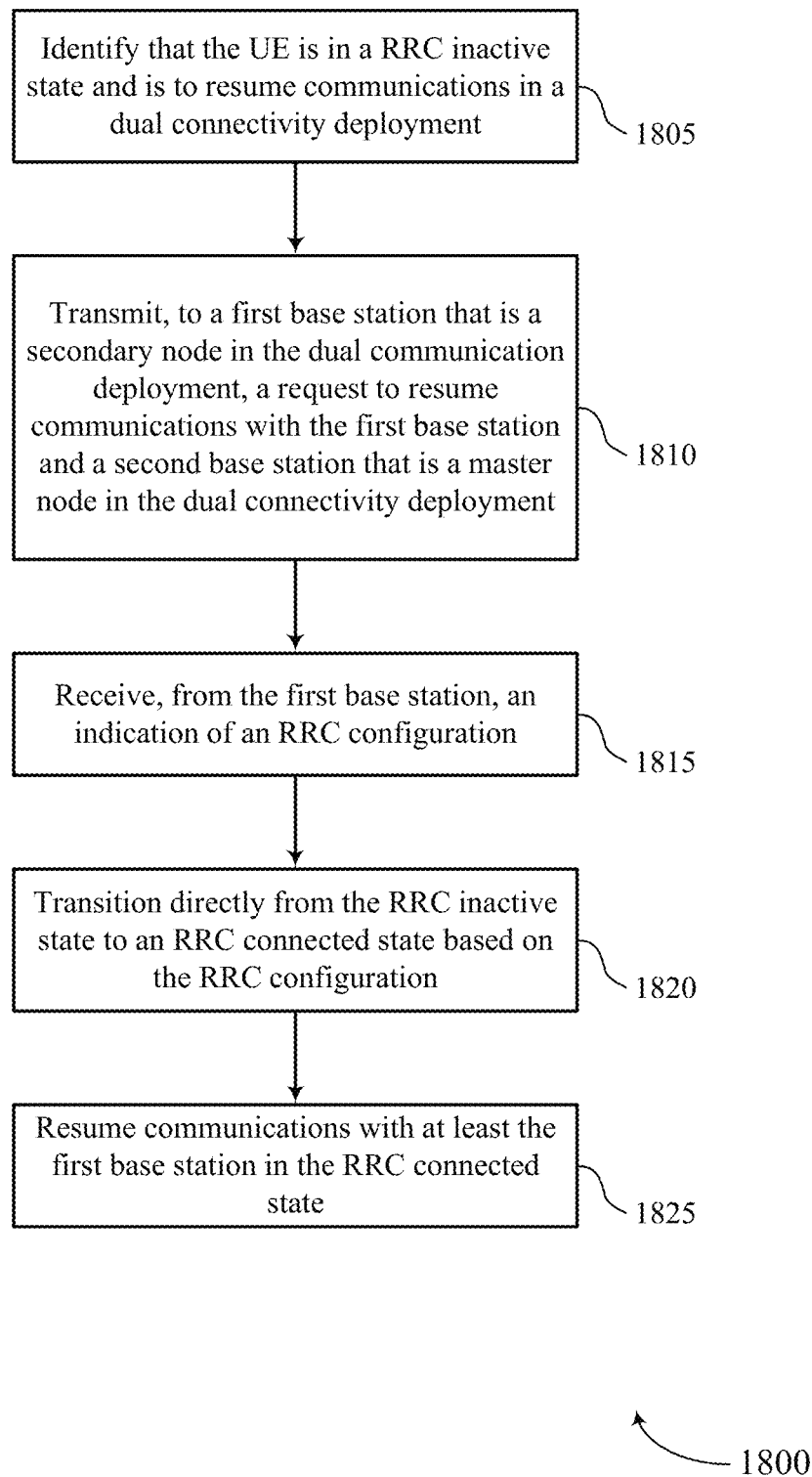

FIG. 18 shows a flowchart illustrating a method 1800 that supports resuming communication with a secondary node in dual connectivity in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1805, the UE may identify that the UE is in an RRC inactive state and is to resume communications in a dual connectivity deployment. The operations of 1805 may be performed according to the methods described herein. In some examples, aspects of the operations of 1805 may be performed by a state manager as described with reference to FIGS. 9 through 12.

At 1810, the UE may transmit, to a first base station that is a secondary node in the dual connectivity deployment, a request to resume communications with the first base station and a second base station that is a master node in the dual connectivity deployment.

The operations of 1810 may be performed according to the methods described herein. In some examples, aspects of the operations of 1810 may be performed by a resume request manager as described with reference to FIGS. 9 through 12.

At 1815, the UE may receive, from the first base station, an indication of an RRC configuration. The operations of 1815 may be performed according to the methods described herein. In some examples, aspects of the operations of 1815 may be performed by a configuration manager as described with reference to FIGS. 9 through 12.

At 1820, the UE may transition directly from the RRC inactive state to an RRC connected state based on the RRC configuration. The operations of 1820 may be performed according to the methods described herein. In some examples, aspects of the operations of 1820 may be performed by a state manager as described with reference to FIGS. 9 through 12.

At 1825, the UE may resume communications with at least the first base station in the RRC connected state. The operations of 1825 may be performed according to the methods described herein. In some examples, aspects of the operations of 1825 may be performed by a resumption manager as described with reference to FIGS. 9 through 12.

Figure 19:
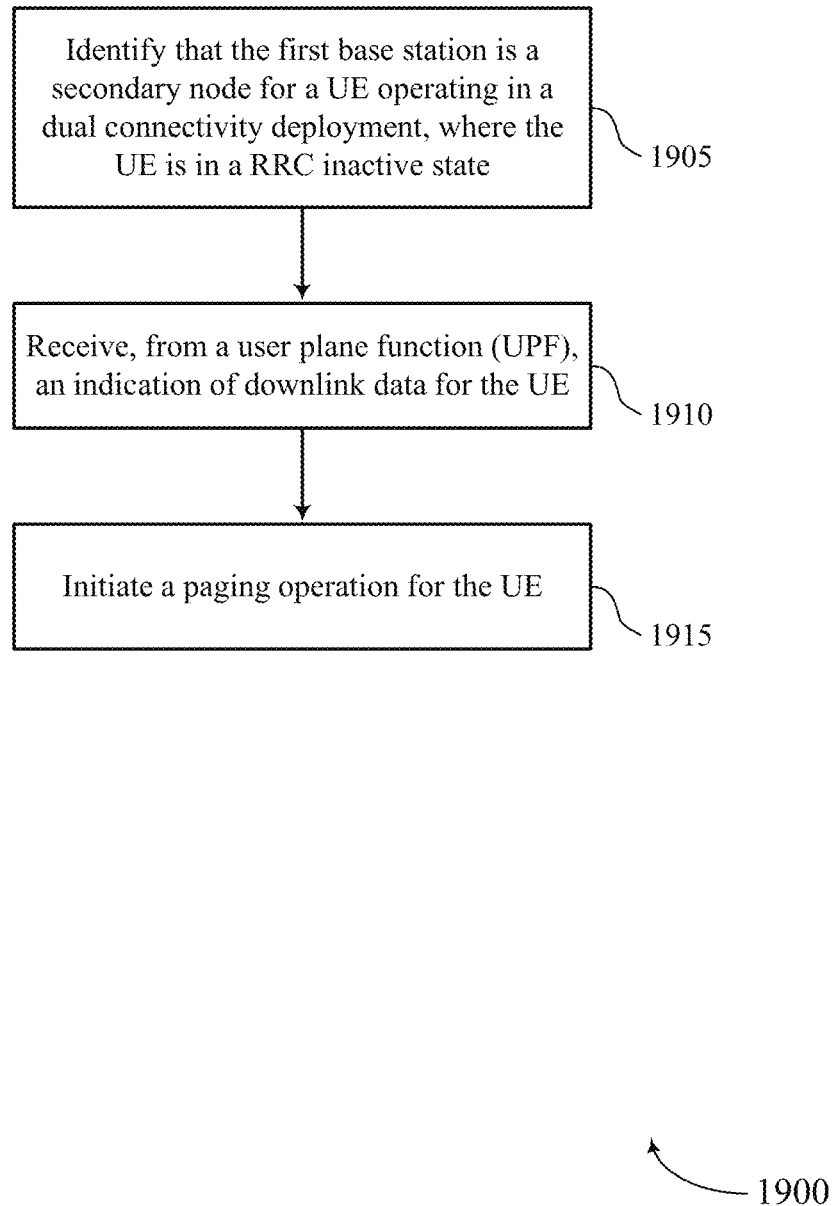

FIG. 19 shows a flowchart illustrating a method 1900 that supports resuming communication with a secondary node in dual connectivity in accordance with aspects of the present disclosure. The operations of method 1900 may be implemented by a base station 105 or its components as described herein. For example, the operations of method 1900 may be performed by a base station communications manager as described with reference to FIGS. 13 through 16. In some examples, a base station may execute a set of instructions to control the functional elements of the base station to perform the functions described herein. Additionally or alternatively, a base station may perform aspects of the functions described below using special-purpose hardware.

At 1905, the base station may identify that the first base station is a secondary node for a UE operating in a dual connectivity deployment, where the UE is in an RRC inactive state. The operations of 1905 may be performed according to the methods described herein. In some examples, aspects of the operations of 1905 may be performed by a node manager as described with reference to FIGS. 13 through 16.

At 1910, the base station may receive, from a UPF, an indication of downlink data for the UE. The operations of 1910 may be performed according to the methods described herein. In some examples, aspects of the operations of 1910 may be performed by a downlink manager as described with reference to FIGS. 13 through 16.

At 1915, the base station may initiate a paging operation for the UE. The operations of 1915 may be performed according to the methods described herein. In some examples, aspects of the operations of 1915 may be performed by a paging manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like).

An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first network device, the method comprising:
    identifying that the first network device is a secondary node for a user equipment (UE) operating in a dual connectivity deployment, wherein the UE is in a radio resource control (RRC) inactive state;
    receiving, from the UE, a request to resume communications with the first network device and a second network device that is a master node in the dual connectivity deployment;
    verifying the UE using an access stratum context associated with the UE; and
    resuming the communications with the UE based at least in part on the request and the access stratum context.

2. The method of claim 1, wherein verifying the UE using the access stratum context comprises:
    transmitting a request for verification of the UE to the master node; and
    receiving a verification confirmation from the master node, wherein the access stratum context is stored at the master node and the secondary node.

3. The method of claim 1, wherein verifying the UE using the access stratum context comprises:
    verifying the UE at the secondary node, wherein the access stratum context is stored at the secondary node.

4. The method of claim 1, wherein resuming the communications with the UE comprises:
    communicating with an access mobility function to transition the first network device from the secondary node to the master node; and
    communicating with the UE as the master node.

5. The method of claim 4, further comprising:
    transmitting, to the UE, an indication of an RRC configuration; and
    receiving, from the UE, an indication of an RRC connection with the first network device, wherein the first network device is connected as a new master node in the dual connectivity deployment.

6. The method of claim 4, further comprising:
transmitting, to the second network device, a request to resume upper layer communications based at least in part on the request to resume the communications from the UE;
receiving, from the second network device, an acknowledgement of the request to resume the upper layer communications; and
transmitting, to the UE, an indication to resume radio resource control (RRC) communications.

7. The method of claim 6, further comprising:
splitting a signaling radio bearer into a first portion associated with the first network device and a second portion associated with the second network device, wherein the indication to resume RRC communications is transmitted via the first portion of the signaling radio bearer.

8. The method of claim 6, wherein the acknowledgement comprises an indication of a suspension of a lower layer.

9. The method of claim 6, wherein the indication to resume RRC communications comprises an indication of a suspension of a lower layer of a secondary cell group associated with the first network device based at least in part on the acknowledgement.

10. The method of claim 6, further comprising:
identifying a measurement configuration associated with the second network device or with a radio access network (RAN), wherein the indication to resume RRC communications comprises the measurement configuration;
receiving, from the UE, a measurement report associated with the second network device, wherein the measurement report corresponds to the measurement configuration;
transmitting, to the second network device, a request to resume lower layer communications; and
receiving, from the second network device, an acknowledgement of the request to resume the lower layer communications.

11. The method of claim 10, further comprising:
receiving a second measurement report on a first RAN from the UE before receiving the request to resume the communications; and
identifying, based at least in part on receiving the measurement report, that the measurement report is associated with a second RAN different than the first RAN, wherein transitioning from the secondary node to the master node and establishing a new secondary node are based at least in part on identifying that the measurement report is associated with the second RAN.

12. The method of claim 10, further comprising:
identifying that the measurement report associated with the second network device has not been received from the UE; and
transmitting, to the second network device, a request to release the second network device from the dual connectivity deployment with the UE.

13. The method of claim 1, wherein resuming the communications with the UE comprises:
maintaining the first network device as the secondary node in the dual connectivity deployment; and
communicating with the UE as the secondary node.

14. The method of claim 1, wherein the access stratum context comprises a radio bearer configuration, a resume identity, a radio access network (RAN) paging cycle, a RAN notification area associated with a first radio access technology (RAT) and a second RAT, a periodic timer, a next hop chaining control parameter (NCC) and corresponding secondary node key (S-kgNB), a measurement associated with the first network device, and a measurement associated with the second network device.

15. The method of claim 1, further comprising:
reconfiguring, before receiving the request from the UE, a split bearer or a temporary data radio bearer for communication with the UE.

16. The method of claim 1, further comprising:
adding one or more temporary data radio bearers to the first network device for forwarding data between the first network device and the second network device, wherein the one or more temporary data radio bearers correspond to one or more data radio bearers that are terminated at the second network device.

17. A method for wireless communication at a user equipment (UE), the method comprising:
identifying that the UE is in a radio resource control (RRC) inactive state and is to resume communications in a dual connectivity deployment;
transmitting, to a first network device that is a secondary node in the dual connectivity deployment, a request to resume the communications with the first network device and a second network device that is a master node in the dual connectivity deployment;
receiving, from the first network device, an indication of an RRC configuration;
transitioning directly from an RRC inactive state to an RRC connected state based at least in part on the RRC configuration; and
resuming the communications with at least the first network device in the RRC connected state.

18. The method of claim 17, wherein:
transitioning directly from the RRC inactive state to the RRC connected state comprises transitioning from the RRC inactive state to the RRC connected state without entering an RRC idle state.

19. The method of claim 17, wherein:
resuming the communications with at least the first network device comprises resuming the communications with the first network device as the master node.

20. The method of claim 19, wherein:
resuming the communications with at least the first network device comprises resuming the communications with a third network device as a new secondary node.

21. The method of claim 17, wherein:
resuming the communications with at least the first network device comprises resuming the communications with the first network device as the secondary node.

22. The method of claim 17, further comprising:
receiving, from the first network device, an indication of a suspension of a lower layer of a secondary cell group associated with the second network device.

23. The method of claim 22, further comprising:
receiving, from the first network device, an indication to resume RRC communications via a portion of a signaling radio bearer associated with the first network device.

24. The method of claim 17, further comprising:
receiving, from the first network device, an indication of a measurement configuration associated with the second network device; and
transmitting, to the first network device, a measurement report associated with the second network device, wherein the measurement report is based at least in part on the indication of the measurement configuration associated with the second network device.

25. The method of claim 17, further comprising:
performing a measurement based on a stored measurement configuration, wherein the measurement is performed before entering the RRC inactive state.

26. An apparatus for wireless communication at a user equipment (UE), the apparatus comprising:
one or more processors;
one or more memories coupled with the one or more processors; and
instructions stored in the one or more memories and executable by the one or more processors to cause the apparatus to:
identify that the UE is in a radio resource control (RRC) inactive state and is to resume communications in a dual connectivity deployment;
transmit, to a first network device that is a secondary node in the dual connectivity deployment, a request to resume the communications with the first network device and a second network device that is a master node in the dual connectivity deployment;
receive, from the first network device, an indication of an RRC configuration;
transition directly from an RRC inactive state to an RRC connected state based at least in part on the RRC configuration; and
resume the communications with at least the first network device in the RRC connected state.

27. The apparatus of claim 26, the instructions are further executable by the one or more processors to cause the apparatus to transition directly from the RRC inactive state to the RRC connected state comprises transitioning from the RRC inactive state to the RRC connected state without entering an RRC idle state.

28. The apparatus of claim 26, wherein, to resume the communications with the UE, the instructions are further executable by the one or more processors to cause the apparatus to:
communicate with an access mobility function to transition the first network device from the secondary node to the master node; and
communicate with the UE as the master node.

29. An apparatus for wireless communication at a first network device, the apparatus comprising:
one or more processors;
one or more memories coupled with the one or more processors; and
instructions stored in the one or more memories and executable by the one or more processors to cause the apparatus to:
identify that the first network device is a secondary node for a user equipment (UE) operating in a dual connectivity deployment, wherein the UE is in a radio resource control (RRC) inactive state;
receive, from the UE, a request to resume communications with the first network device and a second network device that is a master node in the dual connectivity deployment;
verify the UE using an access stratum context associated with the UE; and
resume the communications with the UE based at least in part on the request and the access stratum context.

30. The apparatus of claim 29, wherein, to verify the UE using the access stratum context, the instructions are further executable by the one or more processors to cause the apparatus to:
transmit a request for verification of the UE to the master node; and
receive a verification confirmation from the master node, wherein the access stratum context is stored at the master node and the secondary node.

* * * * *